(12) United States Patent
Zhang

(10) Patent No.: US 6,865,599 B2
(45) Date of Patent: Mar. 8, 2005

(54) BROWSER-TO-BROWSER, DOM-BASED, PEER-TO-PEER COMMUNICATION WITH DELTA SYNCHRONIZATION

(76) Inventor: Chenglin Zhang, 15 Newton St., Southboro, MA (US) 01772

( * ) Notice: Subject to any disclaimer, the term of this patent is extended or adjusted under 35 U.S.C. 154(b) by 334 days.

(21) Appl. No.: 10/234,229

(22) Filed: Sep. 3, 2002

(65) Prior Publication Data

US 2003/0101235 A1 May 29, 2003

Related U.S. Application Data

(60) Provisional application No. 60/340,606, filed on Dec. 13, 2001, and provisional application No. 60/316,994, filed on Sep. 4, 2001.

(51) Int. Cl.[7] .............................................. G06F 15/16
(52) U.S. Cl. ....................... 709/218; 709/246; 719/318
(58) Field of Search ............................... 709/218, 205, 709/246; 719/318

(56) References Cited

U.S. PATENT DOCUMENTS

| | | | | |
|---|---|---|---|---|
| 6,199,082 B1 | * | 3/2001 | Ferrel et al. ................ | 715/522 |
| 6,643,652 B2 | * | 11/2003 | Helgeson et al. ............ | 707/10 |
| 6,725,203 B1 | * | 4/2004 | Seet et al. .................... | 705/14 |

* cited by examiner

*Primary Examiner*—Frantz B. Jean
(74) *Attorney, Agent, or Firm*—Pandiscio & Pandiscio

(57) ABSTRACT

A peer-to-peer communication system for use over an underlying computer network system, the peer-to-peer communication system comprising: a web browser; and a broker interposed between the browser and the underlying computer network system, with the broker being adapted to (1) monitor a first event taking place within the browser, encode the first event and associated changes in a first event message, and push the first event message to the at least one other peer over the underlying computer network system.

76 Claims, 29 Drawing Sheets

T1,T2: Objects in Browser 1. They can be image, table, form, voice clip, or any HTML/XHTML/XML objects.
T1',T2': Objects in Browser 2. They are instant synchronizations of T1/T2 in Browser 1.

Figure 8 Peer Selection Indication

Peer 1        Peer 2

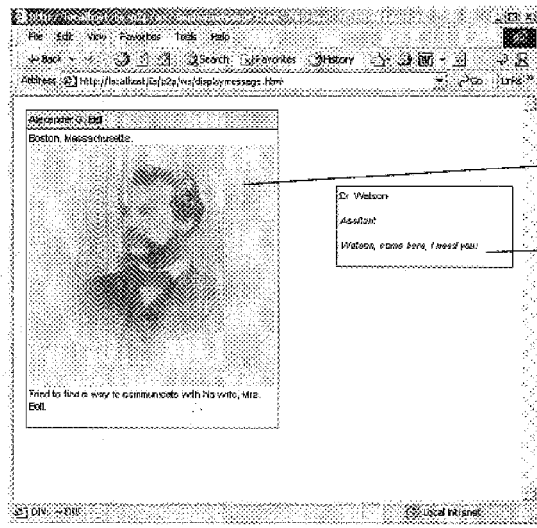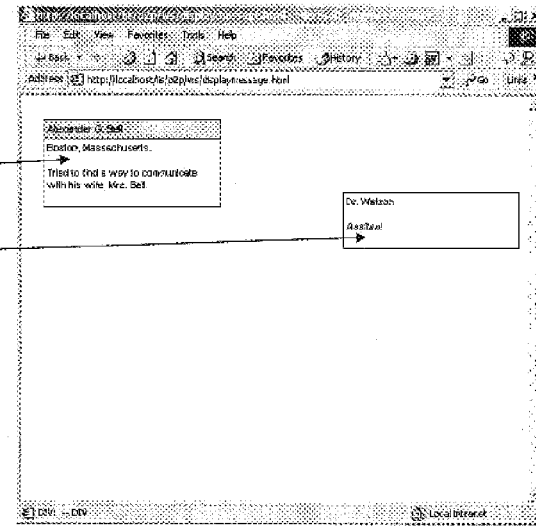

Demo #1: Bell and Watson. Peer 1 and Peer 2 communicate through browsers. Initial screen for both Peer 1 and Peer 2 are the same as shown in that of Peer 2. The picture of Alexander G. Bell will be synchronized to Peer 2 immediately after Peer 1 inserts it, as indicated in arrow ①. The text message "Watson, come here, I need you!" will also be synchronized to Peer 2, as indicated in arrow ②. Contents of HTML and XHTML can be used for the communication.

FIG. 9

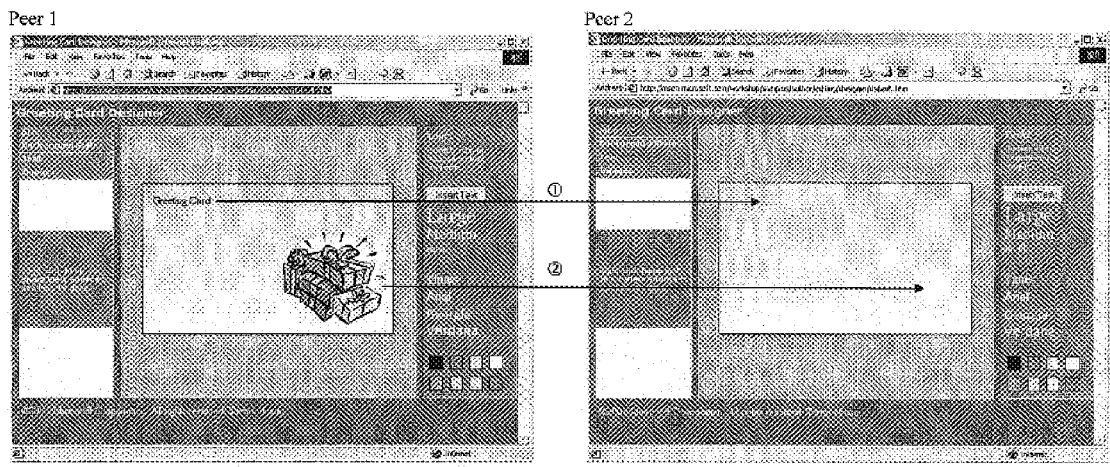

Demo #2: Microsoft Greeting Card Designer. The designer was published in Microsoft Web site as a standalone Web page. The invention turns it into a cooperative designer without altering the Microsoft Web site. Both peers get the same initial Greeting Card Designer page from the Microsoft Web site. Peer 1 inserts a text message and a gift image. The text message "Greeting Card" in Peer 1 will be synchronized to Peer 2, as indicated in arrow ①. The same gift picture in Peer 1 will appear at the same position in Peer 2 when Peer 1 inserts the image, as indicated in arrow ②.

FIG. 10

Demo #3: HTML Form. The Web form was published in Xerox Web site as a standalone HTML form. The invention turns it into a cooperative form without altering the Web site. Text inputs or selections in one form will appear automatically in another form, as indicated in arrows ①, ②, ③, ④, and ⑤.

FIG. 11

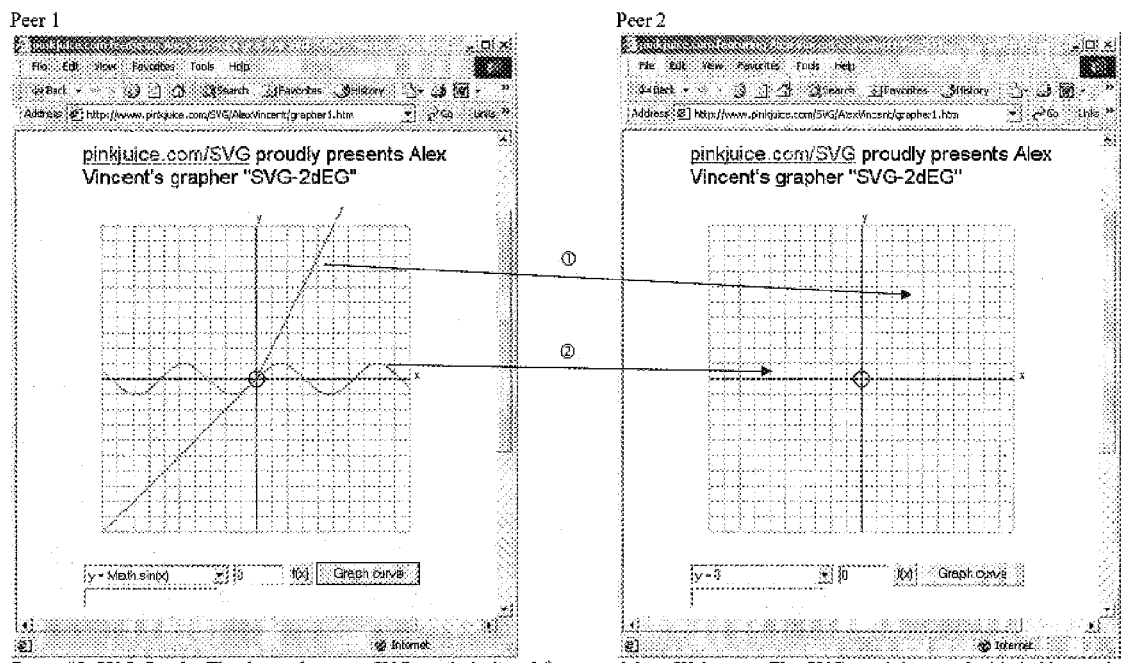

Demo #5: SVG Graph. The demo shows an SVG graph designed for a standalone Web page. The SVG graph is an embedded object to the browsers. The invention turns it into a cooperative graphing tool without altering the Web site. The controls for the graph are HTML form elements. Drawing actions in one SVG graph will happen automatically in another SVG graph, as indicated in arrows ① and ②.

FIG. 13

Demo #6: SVG Animation. The demo shows an SVG animation designed for a standalone Web page. The SVG animation is an embedded object to the browsers. The invention makes it possible for one peer to start or stop the animation for another peer without altering the Web site. The controls are the HTML form buttons, as indicated in arrow ①.

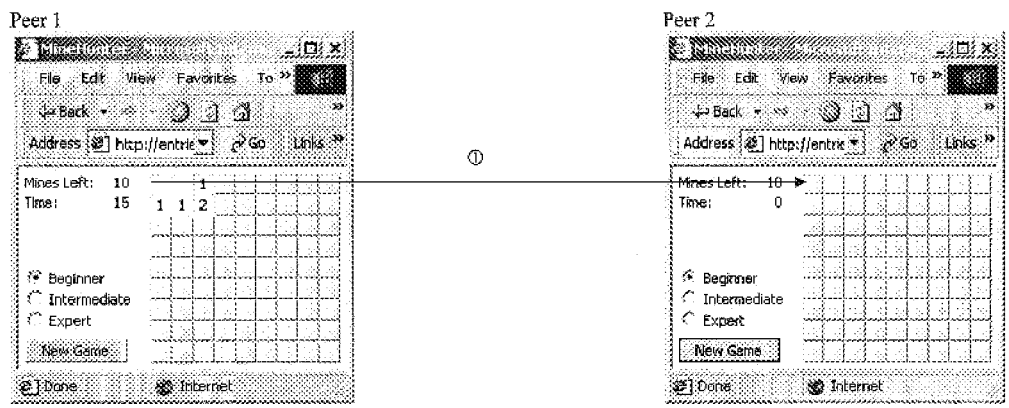

Demo #7: Mine Hunter Game in DHTML. The game was published at "the5k" Web site as a single player game. The demo shows the possibility of turning it into a multi player game by capturing user events. Arrow ① indicates that a mouse click event in Peer 1 is transferred to Peer 2, which will cause Peer 2 to hunter mines at the same position. The initial board layout should be made the same before the game starts. This can be achieved by sending the board layout of Peer 1 to Peer 2 once the board initialization is finished in Peer 1.

FIG. 15

Demo #8: Navigate Together. The demo shows two peers navigate the W3C Web site together. When Peer 1 navigates to "http://www.w3c.org/DOM/" from "http://www.w3c.org/", the event is captured and sent to Peer 2. Peer 2 will navigate to the same page to respond to the event, as arrow ① indicates.

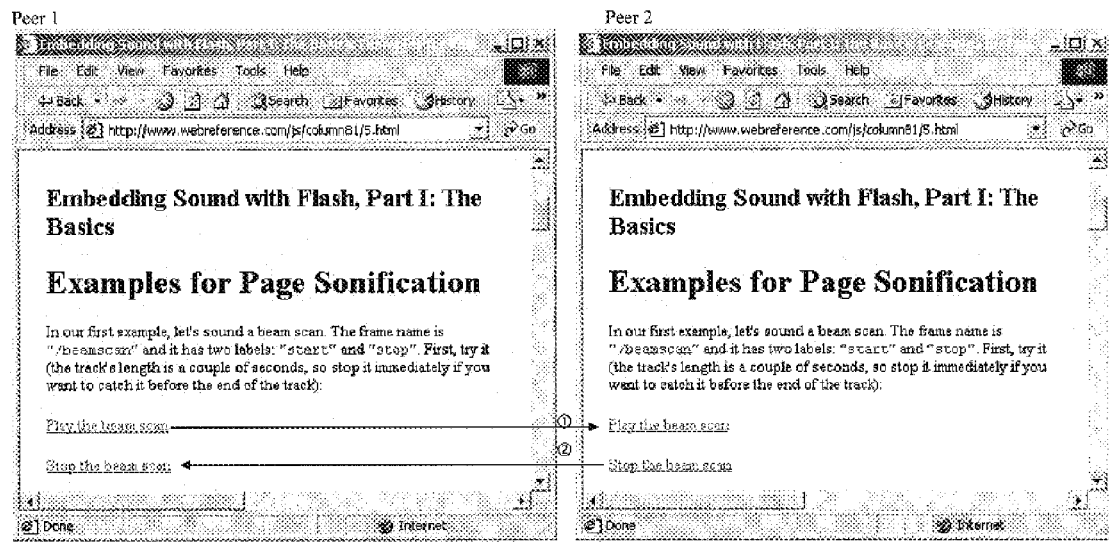

Demo #9: Flash Sound. The demo shows two sound clips of Flash audio designed for a standalone Web page. The sounds are embedded objects to the browsers. The invention makes it possible for one peer to start or stop the sounds for another peer without altering the Web site. The controls are HTML links. Arrow ① indicates Peer 1 starts a sound. Peer 2 then stops it, as shown in Arrow ②.

FIG. 17

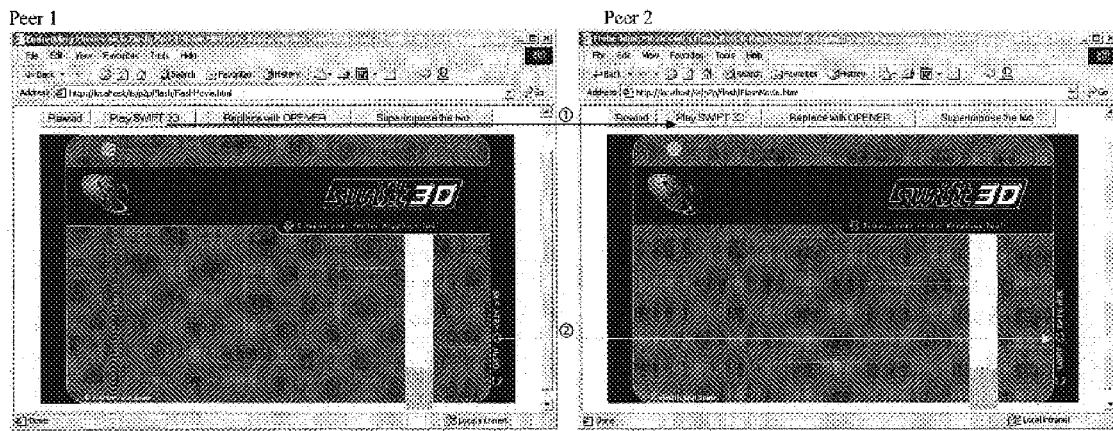

Demo #10: Flash Video. The demo shows a Flash movie designed for a standalone Web page. The movie is an embedded object to the browsers. The invention makes it possible for one peer to control the movie for another peer. Arrow ① indicates Peer 1 starts the movie and Peer 2 has the movie started automatically by the event. The control is the "Play SWIFT 3D" button of the host HTML document. Another kind of control is from the embedded object itself. In this demo, the "STOP" button in the SWIFT 3D movie of Peer 1 is a control. A click event on the control of Peer 1 can be seen in Peer 2 only if the event is passed to the host document of Peer1, and the corresponding control in Peer 2 is exposed to its host document. Generally FSCommand or GetURL commands in Flash player should be used.

FIG. 18

Demo #11: Flash Player in Microsoft Behaviors. The demo shows a Flash movie implemented in Microsoft Behaviors. The movie is exposed to the DOM model of the host document. Therefore, it can be copied or removed as regular HTML DOM elements.
Arrow ① indicates Peer 1 copies the movie to itself. Peer 2 will get the event and have the copy replayed in the browser.

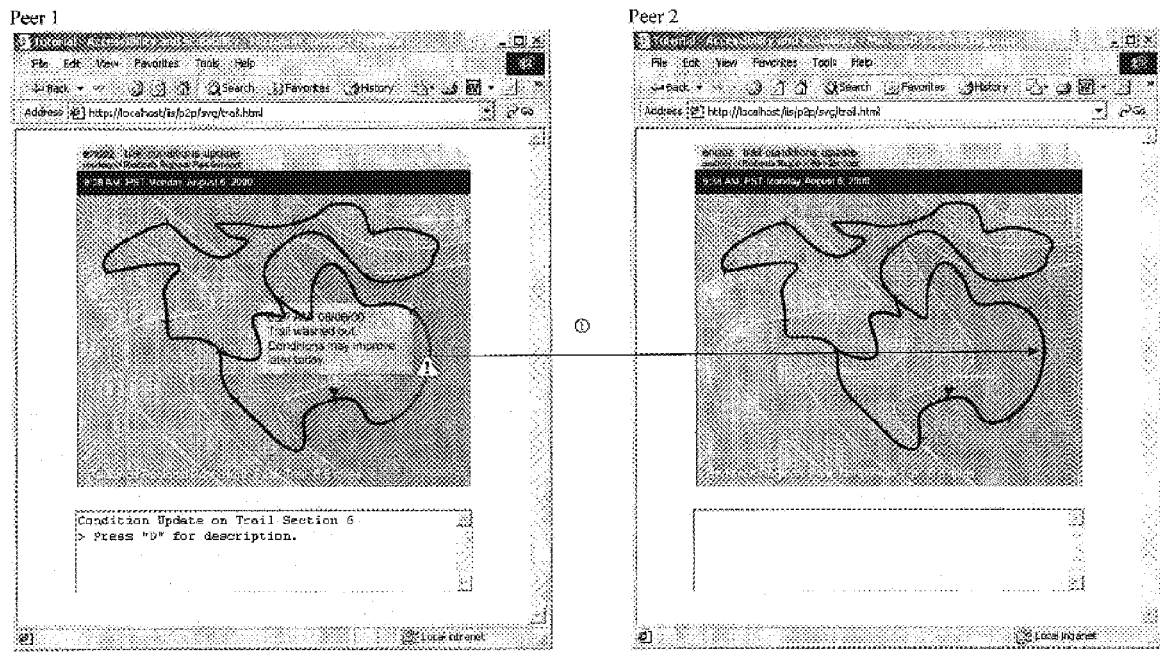

Demo #12: SVG MAP with DOM. The demo shows an SVG map in Adobe SVGViewer. The SVG map is an embedded object to the browsers. The invention makes it possible for peers to explorer the map together. The SVG DOM allows the host documents to capture the events of the embedded objects, and manipulate their internal structures. The actions can then be synchronized, as shown in arrows ①.

FIG. 20

Demo #13: SVG Draw. The demo shows an SVG white board. Drawing actions in one SVG board will happen automatically in another SVG board, as indicated in arrows ① and ②. Note that all the objects, events, and actions involved are from the embedded SVG objects.

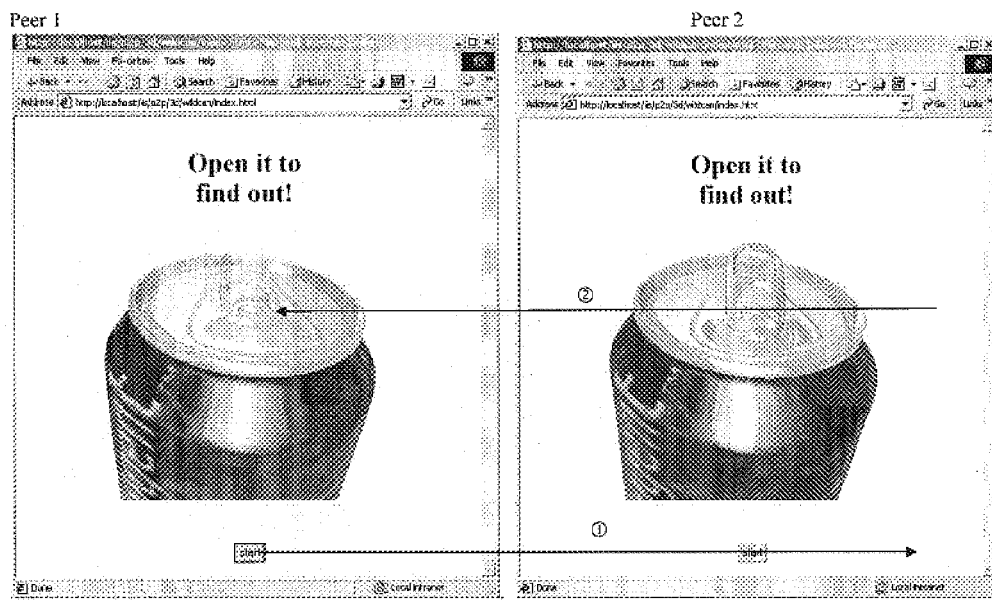

Demo #14: 3D Object. The demo shows a 3D animation in WildTangent 3D plug-in. The embedded object is a Java applet. The invention makes it possible for peers to explorer the 3D object together. It can be controlled from the host document via the HTML button "START", as shown in arrow ①. Control actions can also be issued from the applet itself. In this demo, the lid of the drink can be clicked to open from the top of the can, as shown in arrow ②. The applet needs to expose its "OPEN" event and the corresponding method to the host documents before this kind of interactions can happen.

FIG. 22

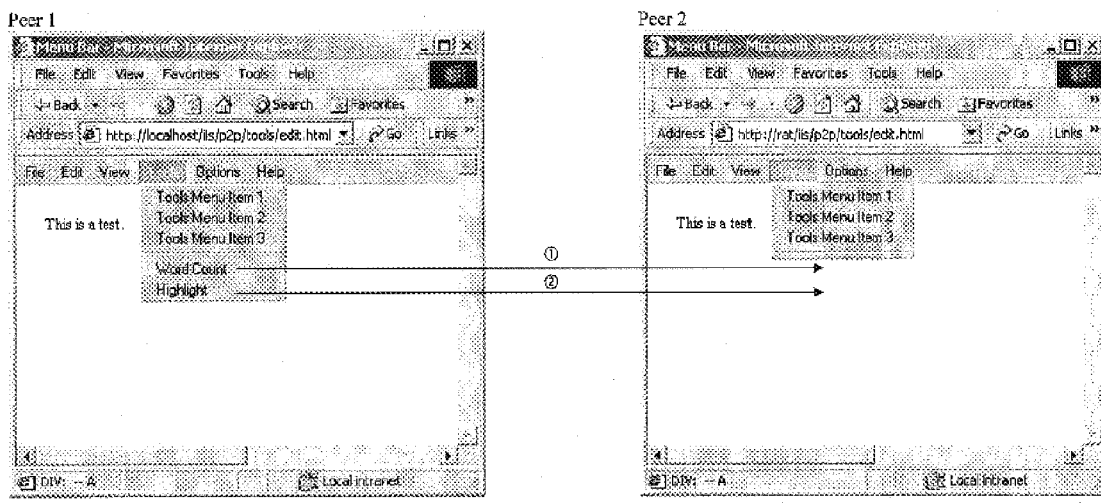

Demo #15: Tool Injection. The demo shows a process of Tool Injection for Javascript tools. Peer 1 has two Javascript tools: "Word Count" and "Highlight", which Peer 2 does not have. When Peer 1 initiates the "Word Count" tool, for example, Peer 2 will try to initiate the same action. Since the tool does not exist in Peer 2, a tool negotiation process starts automatically between Peer 1 and Pee2. Peer 2 will try to fetch the tool from Peer 1. When the negotiation succeeds, the tool will be installed in Peer 2. "Word Count" will be possible there. Arrow ① and ② illustrates the direction of the tool flow.

FIG. 23

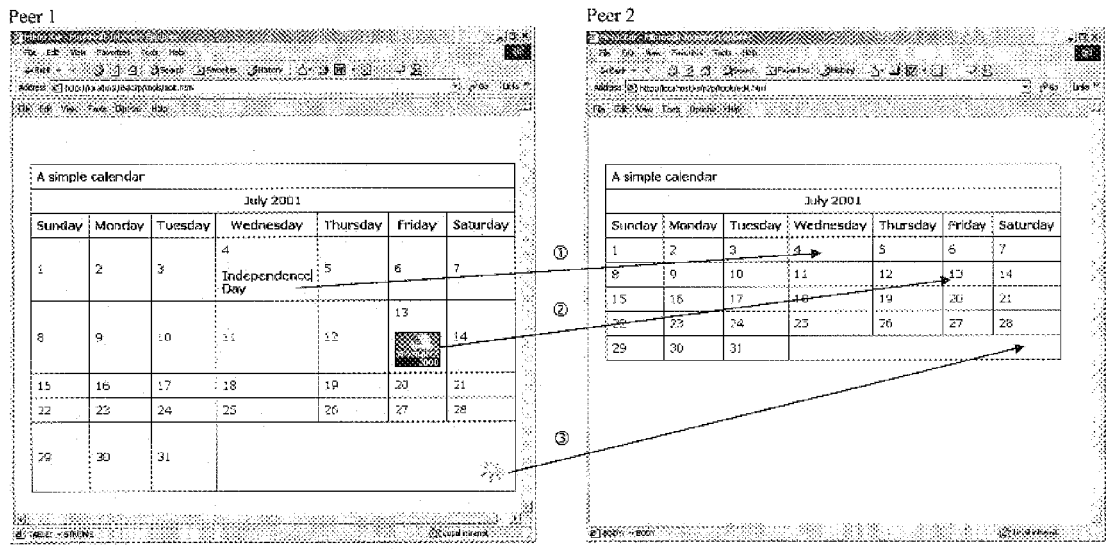

Demo #16: User-Defined Calendar. The demo shows a user-defined calendar with embedded objects in multimedia. Texts, images, and Flash movies, and other multimedia objects, if understandable by the browser, can be freely added to the calendar. They will be synchronized among the participating peers. Arrow ① indicates the text of "Independence Day" of Peer 1 will be synchronized in Peer 2 at July 4th. Arrow ② indicates the image of "Olympics 2008" of Peer 1 will be synchronized in Peer 2 at the choosing date. Arrow ③ indicates that Flash movies can be embedded and synchronized as well.

FIG. 24

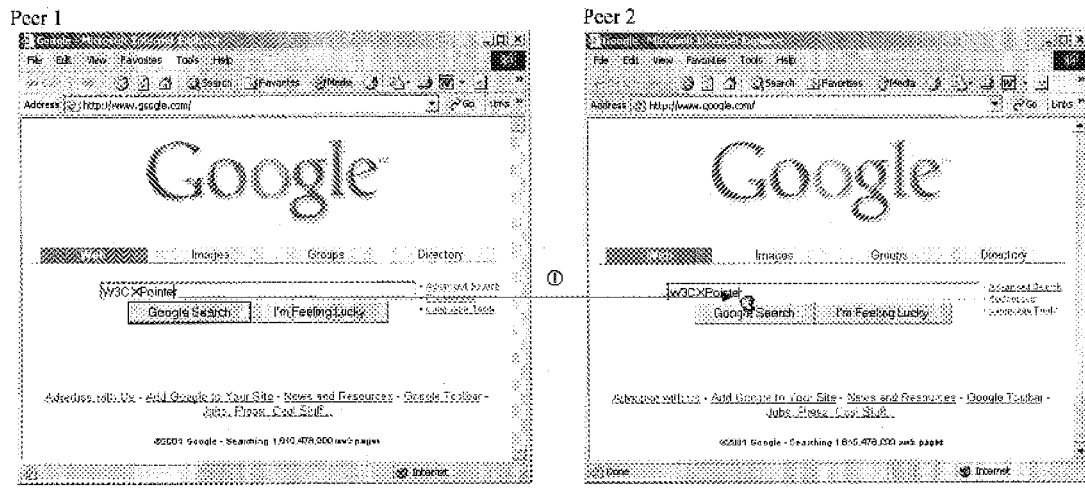

Demo #17: Peer Edit Caret Indication. The demo shows a visual representation of the edit caret position across peer browsers. The edit caret of Peer 1 is shown in Peer 2 as a vertical bar plus a "roster image" of Peer 1. The position of the vertical bar is located at the exact same position of the original edit caret of Peer 1, as illustrated by arrow ①. It moves as the original edit caret moves.
The key to the position synchronization is the use of a range object and its XPointer expression for the cross-browser position exchange. The same synchronization and visual representation applies to other editable contents such as password inputs, textareas, or IE5+ contentEditable areas.

FIG. 25

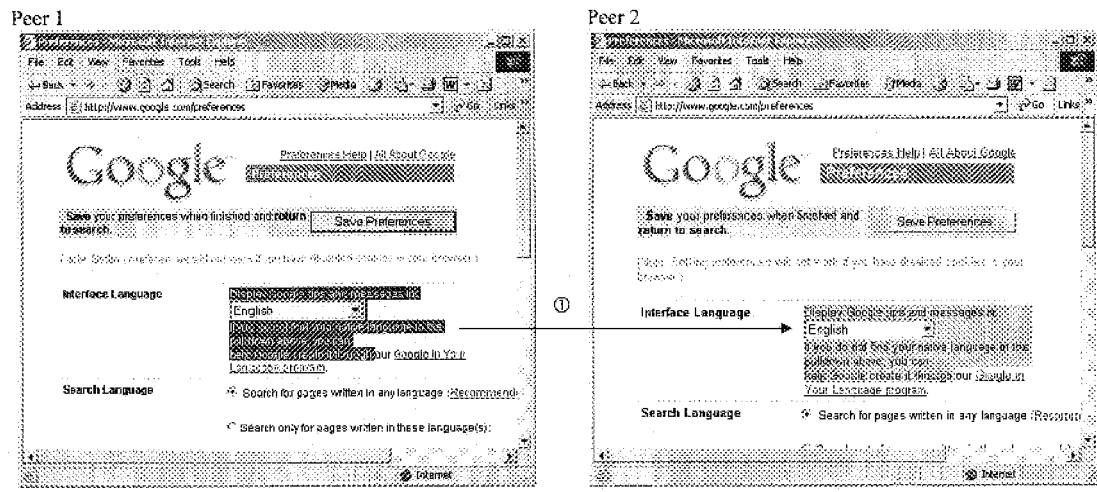

Demo #18: Peer Selection Indication. The demo shows a visual representation of a selection across peer browsers. A selection in Peer 1 is shown in Peer 2 as a shaded area with a light blue background. The start and end positions of the area in Peer 2 matches exactly as they appear in Peer 1, as illustrated by arrow ①. The selection can include Control objects, images, tables as well as textual elements. The differences in peer browsers, browser configurations, font sizes, window sizes, textual flows, etc. won't affect the synchronization the peer selections. The key to the selection synchronization is the use of range objects and their XPointer expressions for the cross-browser selection exchange. The same synchronization and visual representation applies to editable contents such as form inputs, textareas, or IE5+ contentEditable areas.

FIG. 26

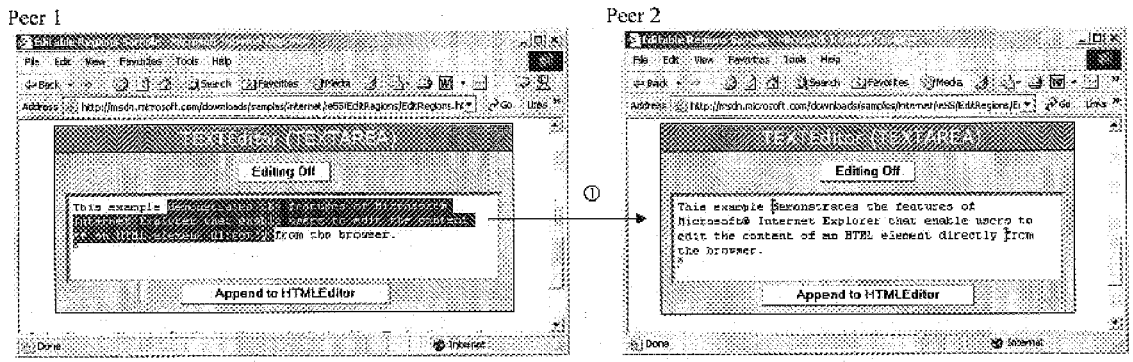

Demo #19: Peer Selection Indication. The demo shows a visual representation of a selection in a textarea across peer browsers. A selection in Peer 1 is shown in Peer 2 as a pair of "[" "]" brackets. The start and end positions of the area in Peer 2 match exactly as they appear in Peer 1, as illustrated by arrow ①, though the textual layout of the two textareas are different. The indicators are clipped to the textarea boundaries whether it is scrolled or resized. The key to the selection synchronization is the use of range objects and their XPointer expressions for the cross-browser selection exchange.

FIG. 27

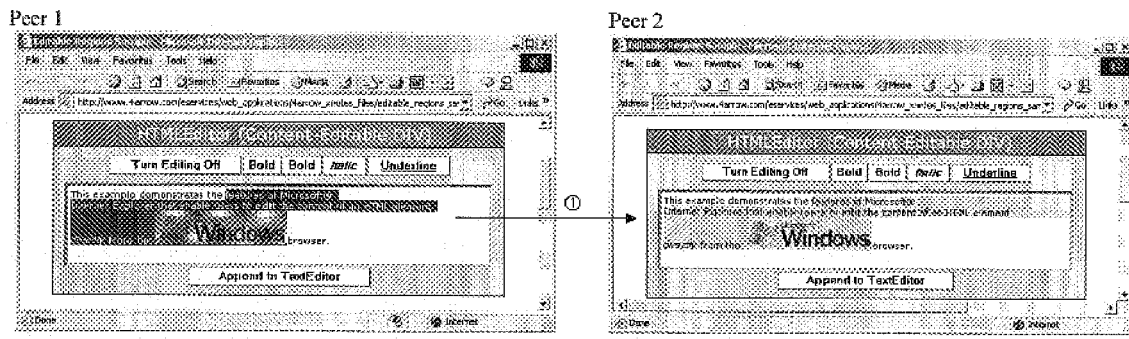

Demo #20: Peer Selection Indication. The demo shows a visual representation of a selection in an IE5+ contentEditable div across peer browsers. A selection in Peer 1 is shown in Peer 2 as a shaded area with a light blue background. The start and end positions of the area in Peer 2 matches exactly as they appear in Peer 1, as illustrated by arrow ①. The shaded area is clipped to the div boundaries whether it is scrolled or resized. The key to the selection synchronization is the use of range objects and their XPointer expressions for the cross-browser selection exchange.

FIG. 28

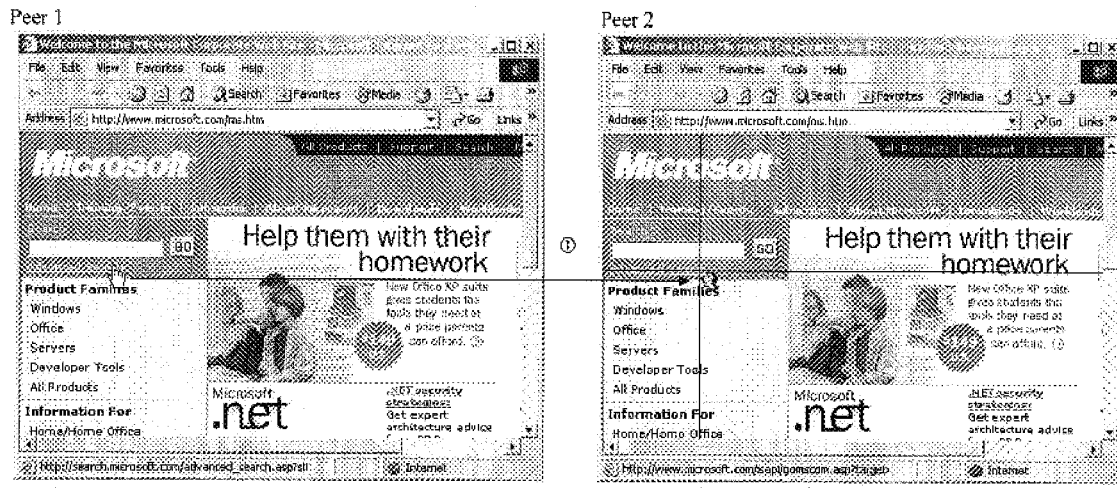

Demo #21: Peer Mouse Cursor Indication. The demo shows a visual representation of mouse cursor position across peer browsers. A hand-shaped mouse cursor in Peer 1 is shown in Peer 2 as a crosshair-shaped mouse cursor with the "roster" image of Peer 1. The position of the crosshair mouse cursor in Peer 2 matches that of hand-shaped cursor in Peer 1 to the precision of individual characters, as illustrated by arrow ①. The key to the mouse cursor synchronization is the use of a range object and its XPointer expression for the cross-browser position exchange for textual elements; and the use of prepositional position adjustment for Control and image objects.

FIG. 29

BROWSER-TO-BROWSER, DOM-BASED, PEER-TO-PEER COMMUNICATION WITH DELTA SYNCHRONIZATION

1. REFERENCE TO PENDING PRIOR PATENT APPLICATIONS

This patent application claims benefit of:

(1) pending prior U.S. Provisional Patent Application Ser. No. 60/316,994, filed Sep. 4, 2001 by Chenglin Zhang for BROWSER-TO-BROWSER DOM-BASED PEER-TO-PEER COMMUNICATION WITH DELTA SYNCHRONIZATION; and (2) pending prior U.S. Provisional Patent Application Ser. No. 60/340,606, filed Dec. 13, 2001 by Chenglin Zhang for BROWSER-TO-BROWSER DOM-BASED PEER-TO-PEER COMMUNICATION WITH DELTA SYNCHRONIZATION.

The two aforementioned patent applications are hereby incorporated herein by reference.

2. FIELD OF THE INVENTION

This invention relates to peer-to-peer computer communications in general. More specifically, this invention relates to a new form of peer-to-peer computer communication based on Web and Instant Messaging protocols.

3. BACKGROUND OF THE INVENTION

The last decade has witnessed the tremendous success and popularity of Web technology that provides access to rich media and content in all forms and formats, thus enabling people to increase the range and scope of communication to a degree never before seen. Instant Messaging (IM) complements the Web by bringing people closely together in real-time and supports the dynamic and flexible nature of a conversation.

Though rich in content and media, the Web tends to be a traditional one-way broadcast medium, like radio and TV, with the largest number of people being passive information consumers; only a few percent are information publishers. People use Web browsers to find and read information. Web designers use special tools to write and publish content. Browsing and authoring are often separated. The Web was not designed to support real-time, peer-to-peer communication.

Instant Messaging (IM) comes closest to a real-world conversation in that all the participants are peers and communication happens in real-time. Generally, the content of an IM exchange is short textual messages and a conversation consists of numerous small messages sent back and forth. Messages are rendered to clients in chronological order. The messages become history once delivered and rendered, and messages are not intended to be changed by the recipients.

In the real world, people use texts, tables, forms, graphs, objects, pictures, sound and many other kinds of audio-visual assistance for communication. The contents often need to be freely referenced and updated during a conversation. A typical example is a cooperative scheduling application, where participants work on a calendar to set up a schedule for upcoming events. During the course of a session, the participants will need to make changes to the calendar and the changes will need to be synchronized in real-time. A few "round-trips" may be necessary before the final schedule can be attained. This kind of communication cannot easily be modeled in current Web or IM technology. This is because the Web has rich content but lacks real-time authoring and peer-to-peer communication. IM, on the other hand, has built-in real-time, peer-to-peer communication but lacks support for rich content and direct content manipulation.

4. SUMMARY OF THE INVENTION

These and other objects are addressed by the provision and use of the present invention which, in one form of the invention, comprises a peer-to-peer communication system for use over an underlying computer network system, the peer-to-peer communication system comprising: at least two peers, each peer comprising: a Web browser; and a broker interposed between the browser and the underlying computer network system, with the broker being adapted to (1) monitor a first event taking place within the browser, encode the first event and associated changes in a first event message, and push the first event message to the at least one other peer over the underlying computer network system, whereby the at least one other peer can reproduce on the at least one other peer the changes associated with the first event; and (2) receive a second event message from the at least one other peer, where the second event message has been encoded to correspond to a second event and associated changes taking place on the at least one other peer, decode the second event message and push the results to the browser, whereby to recreate the changes associated with the second event within the browser.

And in another form of the invention there is provided a method for operating a peer-to-peer communication system over an underlying computer network system, the method comprising: (1) initiating a first event in a first browser; (2) capturing the first event and associated changes with a first broker; (3) encoding the first event and associated changes in a first event message; (4) pushing the first event message to a second broker over the underlying computer network system; (5) decoding the first event message into corresponding commands for recreating the first event and associated changes on a second browser; and (6) pushing the corresponding commands to the second browser, whereby to recreate the changes associated with the second event on the second browser.

And in another form of the invention there is provided a peer-to-peer communication system for use over an underlying computer network system, said peer-to-peer communication system comprising: a broker interposed between a browser located on a peer and the underlying computer network system, with said broker being adapted to (1) monitor a first event taking place within said browser, encode said first event and associated changes in a first event message, and push said first event message to at least one other peer over the underlying computer network system, whereby said at least one other peer can reproduce on said at least one other peer the changes associated with the first event; and (2) receive a second event message from said at least one other peer, where said second event message has been encoded to correspond to a second event and associated changes taking place on said at least one other peer, decode said second event message and push the results to said browser, whereby to recreate the changes associated with the second event within said browser.

5. BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein:

FIGS. 9–29 are a series of schematic illustrations showing various forms of peer-to-peer communication occurring in accordance with the present invention.

6. DETAILED DESCRIPTION OF THE PREFERRED EMBODIMENTS

6.1 Overview

The present invention brings Web browsing, Web authoring and Instant Messaging together. The present invention makes it possible for Web browsers, and the rich media and content in Web browsers, to be available for real-time, peer-to-peer communication. In essence, with the present invention, Web browsers become a content interaction tool as well as a delivery tool for participating peers. Contents are changeable and can be directly manipulated. The changes and manipulation events in a browser can be packaged into messages and delivered to peers in an underlying IM framework or other network communication framework. The underlying communication framework provides basic messaging services for peer addressing and identification, and the simultaneous, asynchronous, and independent exchanges of messages between peers.

Figure 1:
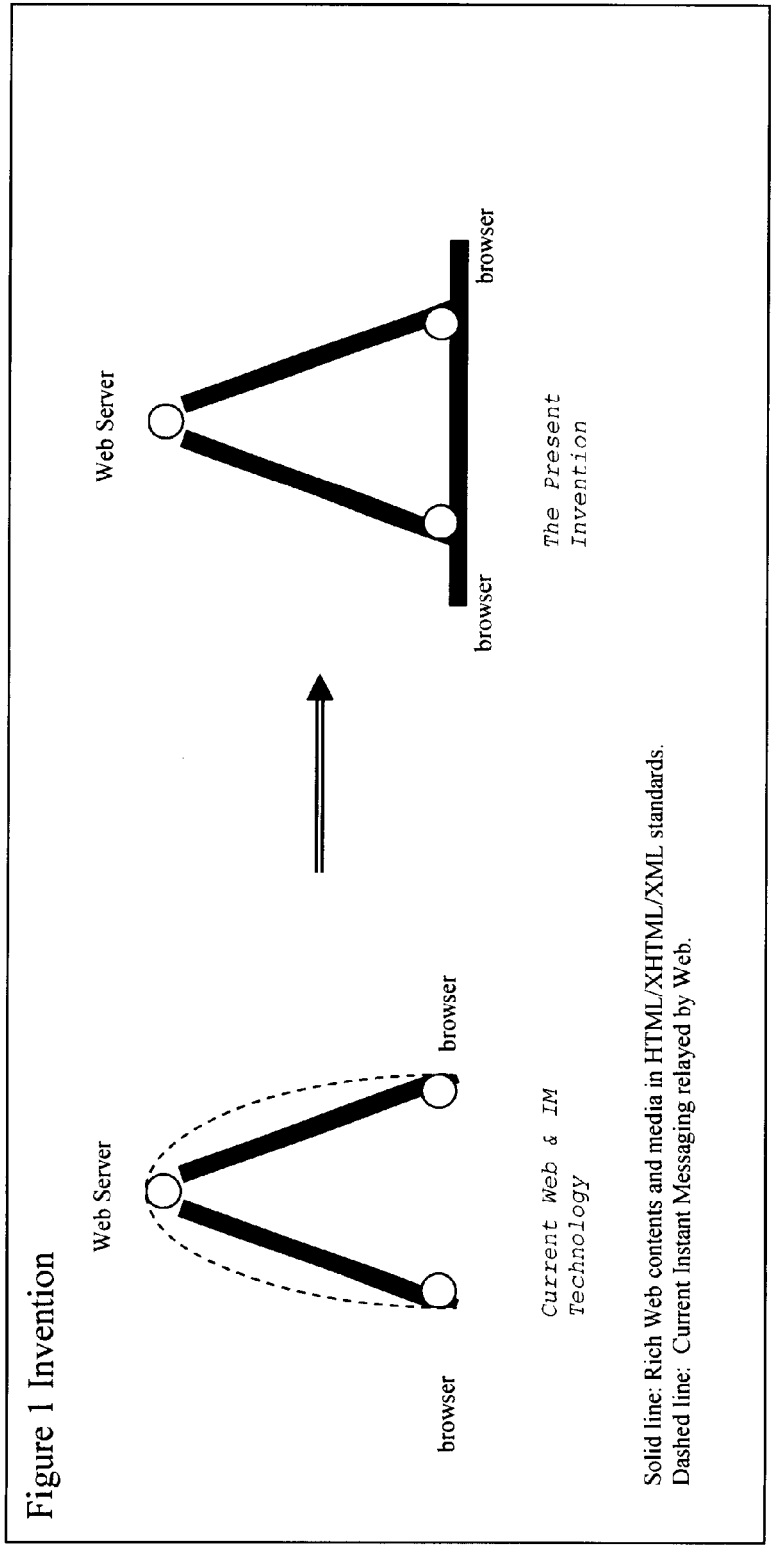
FIG. 1 is a schematic diagram illustrating how the present invention differs from current Web and IM technology.

Looking first at FIG. 1, there are shown certain concepts of the present invention. More particularly, current Web technology provides content from Web server to Web browsers in a publisher-consumer model, as shown in the left part of FIG. 1. Browsers do not talk to each other directly in real-time. Although there are efforts to bring Instant Messaging to Web browsers, the resulting IM systems are essentially just mimics of their desktop counterparts: they are not able to operate on, manipulate, and/or exchange the entire contents and media in a Web browser. Also, the contents that are exchanged are not open for further editing and manipulation. The interactions have to be embedded in a Web page and mediated by a Web server or another messaging server.

The right part of FIG. 1 highlights the present invention with a thick horizontal line, indicating the rich content communication made available by the present invention. Compared to current Web and IM technology, the present invention effectively connects peers together with Web browsers and rich Web contents and media.

More particularly, the present invention uses Web browsers for real-time, peer-to-peer communication. The messages passed among the peers are rich contents in HTML/XHTML/XML and associated Web standards. Any content and media available to Web browsers can be manipulated and exchanged between peers. Peers can design their own contents, objects, and media types to communicate through a Web browser. The interactions happen directly between Web browsers without any dependency on a Web server or any particular Web page.

6.2 Some Significant Features of the Invention

The preferred embodiments of the present invention provide the following significant features, among others:

(1) Instant Access: all communication happens in real-time.

(2) Browser-to-Browser: Web browsers are used as front-ends for the peer-to-peer dialogue.

(3) User-Defined Objects: Peers can create the objects and contents to be exchanged in HTML/XHTML/XML standards and their variations.

(4) Rich Contents and Media: Any content and media types available to Web browsers can be effectively used. Contents can be editable or partially editable.

(5) Delta Synchronization: Contents and objects are uniquely identified. Events and changes ("deltas") are communicated and synchronized among peers.

(6) Tool Injection: Tools in scripts, applets, and plug-ins can be injected into browsers dynamically, making it possible for peers to exchange tools on demand.

(7) Distributed Architecture: Peers are equal participants, and conversations are bi-directional.

(8) Web Page and Web Server Independence: The browser-based communication does not rely on any Web page or any Web server.

(9) Messaging Protocol Independence: The underlying communication can be implemented in any IM or network protocol.

6.3 System Architecture

Figure 2:
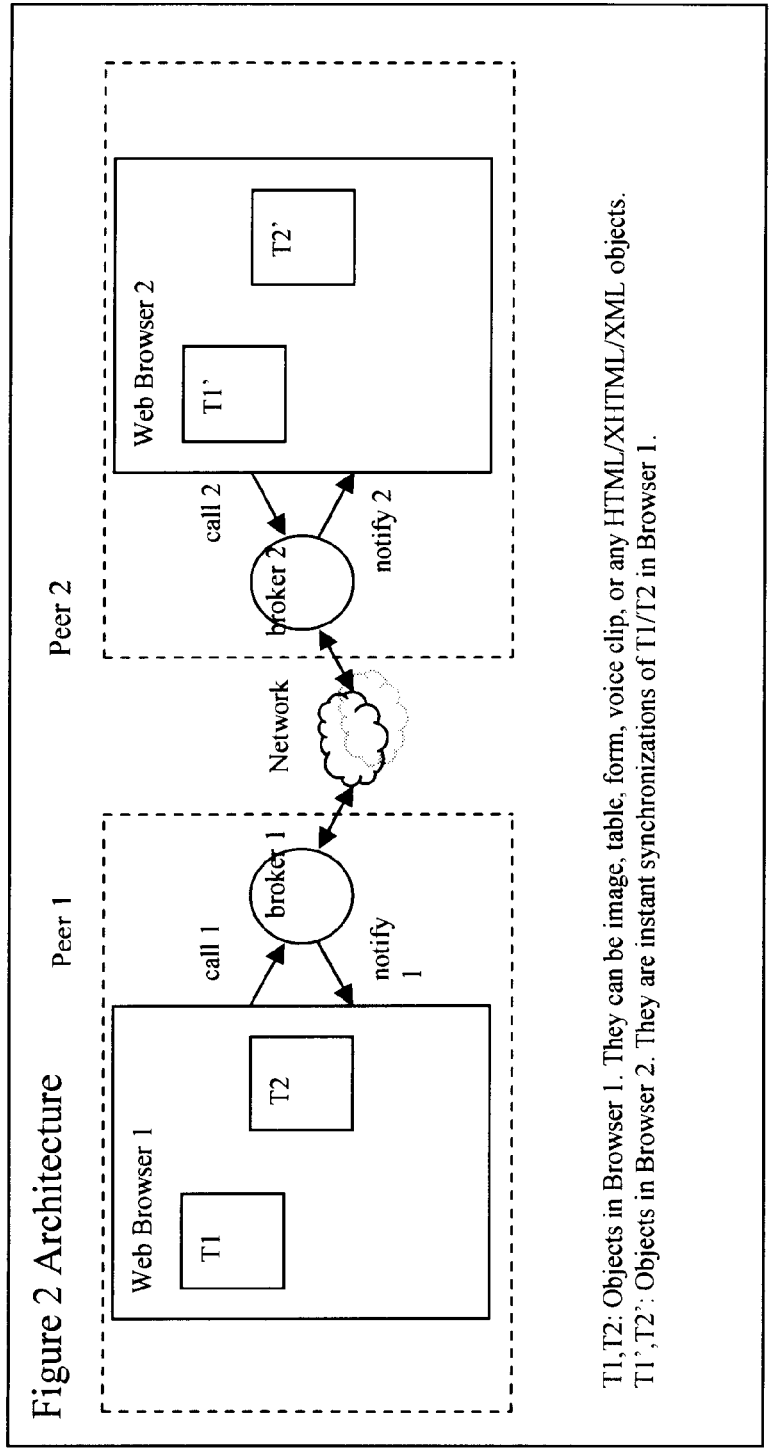
FIG. 2 is a schematic diagram illustrating the general architecture of the present invention.

FIG. 2 illustrates the system architecture underlying the present invention, i.e., FIG. 2 shows the main components of the invention and a typical structure of the components.

More particularly, two peers are shown in FIG. 2:

Peer 1=Web Browser 1+Message Broker 1.

Peer 2=Web Browser 2+Message Broker 2.

For the purpose of the present invention, a browser may be defined as an application or a component that has HTML or XHTML implemented therein, with possible XML extensions. It can be a standalone Web browser such as Microsoft Internet Explorer™ (IE), Netscape Navigator™ (NS), or Mozilla™. It can also be an independent Web browser component such as the Microsoft Web browser control.

A message broker is an information agent for a Web browser. A Web browser needs a message broker to be able to talk to another browser. By way of example, when Browser 1 issues a resize operation on the object T1, the resize message will be sent to Broker 1 (call 1). Broker 1 forwards the call to Broker 2. Broker 2 then notifies Browser 2 (notify 2). Browser 2 will then perform the same resize operation on the counterpart object T2', which results in the creation of a synchronized copy, on Browser 2, of the original object T2 on Browser 1.

Programmatically, the message broker is an event monitor and a content pusher to a Web browser, and a message adapter to underlying communication frameworks. The message broker monitors events and updates from a browser, packages them as a message, adapts them to a specific IM or network protocol, and then has them delivered by the underlying IM or network framework to the other peers. When the message reaches the other peers, their own brokers will translate the message back into browser-understandable events and updates, and push them into their browsers. In this respect it should be appreciated that it is generally more convenient and preferable to use an existing IM framework for the peer identification and message delivery service, however, the invention itself can be implemented on top of any network protocol.

Browser 1 and Broker 1 typically sit on the same machine. Web Browser 2 and Broker 2 typically sit on a different machine. In an extreme case, a broker may be built into a browser, or serve as a browser plug-in. However, the architecture also allows Broker 1 and Broker 2 to be collapsed to a single broker: the single broker can be bundled to Browser 1, or to Browser 2, or serve as an independent broker for both Browser 1 and Browser 2.

The contents in Browser 1 and Browser 2 are represented in HTML/XHTML/XML or their variations. Media types include predefined MIME (Multipurpose Internet Mail Extensions) types for graphics, audio, and video, as well as browser-specific extensions. In addition, the contents can be represented in any character set.

The contents can be partially or fully editable. In the case of Microsoft Internet Explorer (IE) version 5.5 or above, content is fully editable when its "design mode" is turned on. Content is partially editable when some of the elements are marked as "CONTENTEDITABLE". In this respect it should be noted that for all browsers, HTML forms are considered partially editable in the context of the present invention.

Contents need to be uniquely identified so that changes on those contents can be properly synchronized among peers. In accordance with the preferred form of the invention, objects in the browsers are uniquely addressable by established identification mechanisms. Examples of such identification mechanisms can be found in the Document Object Model (DOM) defined by The World Wide Web Consortium (W3C), where an identifier can be an ID attribute for a DOM element in a Browser, or XPATH, XPointer, and XLINK expressions. Another example of such an identification mechanism is specific to IE, where a Markup Pointer and its absolute character position can be used to identify contents in the browser.

Some contents may be read-only because of the requirement from applications. A serial number in a document, for example, may not be subject to editing. Another source of read-only contents could be due to the limitation or design of some Web browsers. The contents in those browsers cannot be updated once rendered, although HTML forms can still be communicated and synchronized with such browsers.

Peers need to identify, authenticate, and exchange presence information whenever a session of Instant Messaging begins. The methods of identification, authentication and address resolution are generally specific to the underlying IM framework which is to be utilized and, to that extent, are outside of the scope of the present invention.

In accordance with the present invention, a peer-to-peer dialogue, or "conversation", typically starts with a blank Web page. Alternatively, some well-defined Web objects like forms, tables, calendars, etc. can be provided to the participants as an aid for composing, organizing, and exchanging ideas. When one peer posts an object on his or her browser, that same object will instantly appear on all of the other peer browsers.

A conversation may also start with existing contents. By way of example, the peers may be exchanging ideas based on an existing Web page, e.g., they may be "discussing" a tentative schedule for a field trip published on the Web. The peers use their Web browsers to read the schedule. With the browser, they have discussions among themselves and decide to re-arrange various items on the schedule. The quality of their communication is greatly improved because they have an existing schedule to start with. More particularly, with this type of dialogue, the initial Web page is replicated to the participating peers from a third party Web server when the conversation starts. The original Web page, however, will not be affected after the changes, since only browsers are involved in the communication. The third party Web server, as well as the original Web page itself, is not altered. This concept is sometimes referred to herein as "Web Page and Web Server Independence".

A dialogue may also start with existing contents, where one peer gets the initial Web page directly from another peer. This arrangement is typically used when the peers need exactly the same page layout to start with, or where a common Web page from a third party server is not available. In an extreme case, all the participating peers may use their own initial pages, from their own (e.g., a local) hard drive or from a shared hard drive. This could happen when the peers need to resume a previous conversation and they all start from their local copies. In this situation object addressing and identification mechanisms must be carefully resolved so as to ensure that precisely the same objects are referenced for the communication.

Where the dialogue is based on an initial Web page, the initial page can be served from any network, including Internet, Intranet, Extranet, or even from a user's local machine. During a conversation, peers can cite contents from various other data sources, such as databases, Web services, and Web sites. The contents can also be from a local or a remote application.

A conversation session may consist of more than one page and span multiple browser windows. Multiple sessions can be running concurrently. Alternatively, a single window can also accommodate multiple sessions, creating a sort of "picture-in-picture" effect in peer-to-peer communication.

The expression "Peer ID+Page URL+DOM Element ID/Expression" provides sufficient information to uniquely identify any events taking place between the participating peers of the same conversation session; when resize, move, edit or other related actions are effected in the browser of one peer, the browser(s) of the other peer(s) will be able to recognize which objects (and which portions of the objects) those actions are addressing and effect the same on their own objects.

Peers can be people, groups, and/or software in the real world. They use the system as a means of coordination, cooperation, or communication. Peers do not have to be people, although in most cases they are.

The illustration of FIG. 2 shows only a two-peer case. Actually, many peers can be involved in a group-like communication. Group communication can be supported with the underlying IM framework. The invention adds a concurrency control mechanism to ensure data consistency among the peer browsers, as will hereinafter be discussed in further detail.

6.4 Operation

When a peer issues an edit operation in Browser 1 for a specific object, the edit message is sent to Broker 1 (call 1). Broker 1 forwards the call to Broker 2. Broker 2 then notifies Web Browser 2 (notify 2). Browser 2 then performs the same edit operation on the copy of the object residing at Peer 2. Thus, both instances of the object are synchronized substantially instantly within the two browsers after the interaction.

The nature of the browser-to-browser interactions are determined by two kinds of "subordinate" connections: the browser-broker connection and the broker-broker connection.

6.4.1 Browser-Broker Connection

In the case of the browser-broker connection, the browser-broker connection can be implemented in:
(1) COM or XPCOM; or
(2) HTTP, XML-RPC, or SOAP.

6.4.1.1 COM and XPCOM

COM (Component Object Model) is a binary compatibility specification and associated implementation developed by Microsoft that allows clients to invoke services provided by COM-compliant components. Since version 4 and up, Internet Explorer (IE) has been implemented as a set of connectable COM objects that exposes its DHTML document object interfaces and event interfaces. The DHTML interfaces allow applications to access the underlying DOM and extend it. The event interfaces make it possible for applications to intercept browser and user events and their associated changes.

With the present invention, the broker monitors events generated by the browser when IE is used. It is implemented in IE in the form of event sinks. Specifically, the broker sinks the IWebBrowserEvents2 interface to monitor the IE browser application or browser control; and the broker sinks the IHTMLDocumentEvents2 interface to monitor the underlying document displayed in the browser; and the broker sinks the IChangeNotify interface to get notified of any changes made to a container (which is essentially a block of HTML objects); and the broker sinks the IHTMLElementEvents2 interface to monitor a particular HTML object within the document. The IHTMLEventObj interface is used to extract the information of an event object, such as the location of the cursor, mouse buttons clicked, keys pressed, and any HTML elements involved in the operation. The IHTMLChangeLog interface provides details of a change, such as the length and absolute character position of the range of the HTML objects involved in the change.

The event object and its associated changes are then encoded as an XML message. Each individual field of the event becomes an element of the XML message, where a field name becomes a tag name; and the field value becomes the content of the corresponding tag. For example, a mouse click event will generate an XML message with an element "<type>click</type>". Peer ID and Page URL need be included as well so as to properly identify the origin of the event. All the information that is required for the successful reproduction of the same event in peer browsers needs to be collected and encoded, including the changes associated with the event. The event object can also carry user-defined information to peer browsers, such as, for example, the Peer ID and the Page URL.

Of particular importance is the way the object references of an event object and its associated changes are encoded. For example, the object reference target (srcElement in IE) indicates where an event originated. The original reference is a memory pointer of the browser. It will become invalid when shipped to another browser, however, since the other browser will most likely be running in a different process space.

The present invention preferably uses the XPointer construct to address the objects involved in an event and their associated changes. XPointer provides a set of syntax for locating objects or ranges of objects across a document. It is based on the structure of a document.

An XPointer expression can be built from DOM. Starting from an object reference, the algorithm walks backwards through the document tree, until the root of the document is found. If along the way any element has an ID attribute, the algorithm stops and the XPointer expression has its root set as the ID attribute value. Any non-ID element between the starting point and the root element has its tag name and its relative position in its siblings of the same tag recorded in the expression. For example, xpointer(id("card")/p[1])

points to the first paragraph indicated by the <p> tag, from the element that has an ID attribute with the value "card".

The expression can be "fine-tuned" to include a particular section of the paragraph: for example, the expression xpointer(string-range(id("card")/p[1]),"",6,12)

points to a sub-string in the aforementioned paragraph. The string starts at the character position 6 (counting from the beginning of the paragraph). The length of the string is 12 characters. This is particularly useful in describing a selection range and the location of an editor caret.

Some browser implementations allow ID attributed values to be non-unique within the same document. The XPointer expression of an element with duplicate ID's can be enhanced to include a sub-expression position()=n, where n is the relative position of the element in all the elements with the same ID within the same document.

The event XML message is a well-formed, but not necessarily valid, XML document. To facilitate cross-platform event exchange among different browsers, the DOM2/3 Event Model is preferably used. An event can be translated to conform to DOM2/3 Event Model before being converted to an XML message. DOM differences in browser implementations should also be considered.

W3C XPointer Recommendation is intended to be a fragment identifier language for the text/xml and application/xml media types. The present invention uses its notations to describe HTML/XHTML contents. The contents can be as simple as characters, strings, numbers, or Booleans; and as complex as nodes, points, and ranges. The algorithm for building an XPointer expression automatically with a given HTML/XHTML object reference is a key to the description of the HTML/XHTML contents.

The XPointer representation as described above is standards-based. A tree-based DOM model is critical in building XPointer expressions. The algorithm can be implemented in all the browsers that support Javascript 1.1+ and DOM 1+ standards.

Microsoft introduced a stream-based HTML document model called Markup Services in IE. The services facilitate HTML document manipulation through a set of interfaces and objects. Specifically, the IMarkupServices, IMarkupContainer, and IMarkupPointer interfaces are used in content addressing and manipulation. This model, though IE specific, can be used to build the DOM-based XPointer expression for any element or position a markup pointer is pointing to. The event monitoring and communication process remains the same as described above.

In the context of the invention, DOM and XPointer are used to address and identify objects in a browser. XML is used to package events and change messages. DOM and browser-specific DHTML are used to access and update the content, structure and style of a document. It is important to note that the basic idea of the invention is independent of DOM, DHTML or XML. The invention can be built on top of the Microsoft's stream-based document model, DHTML model, or any other related models as well. W3C's DOM, XML, and XPointer, however, currently provide the best support for interoperability across different browsers because of the standards.

Changes induce events. By monitoring all the events happening in a browser, any changes to the underlying document can be effectively determined and communicated to peers.

Figure 3:
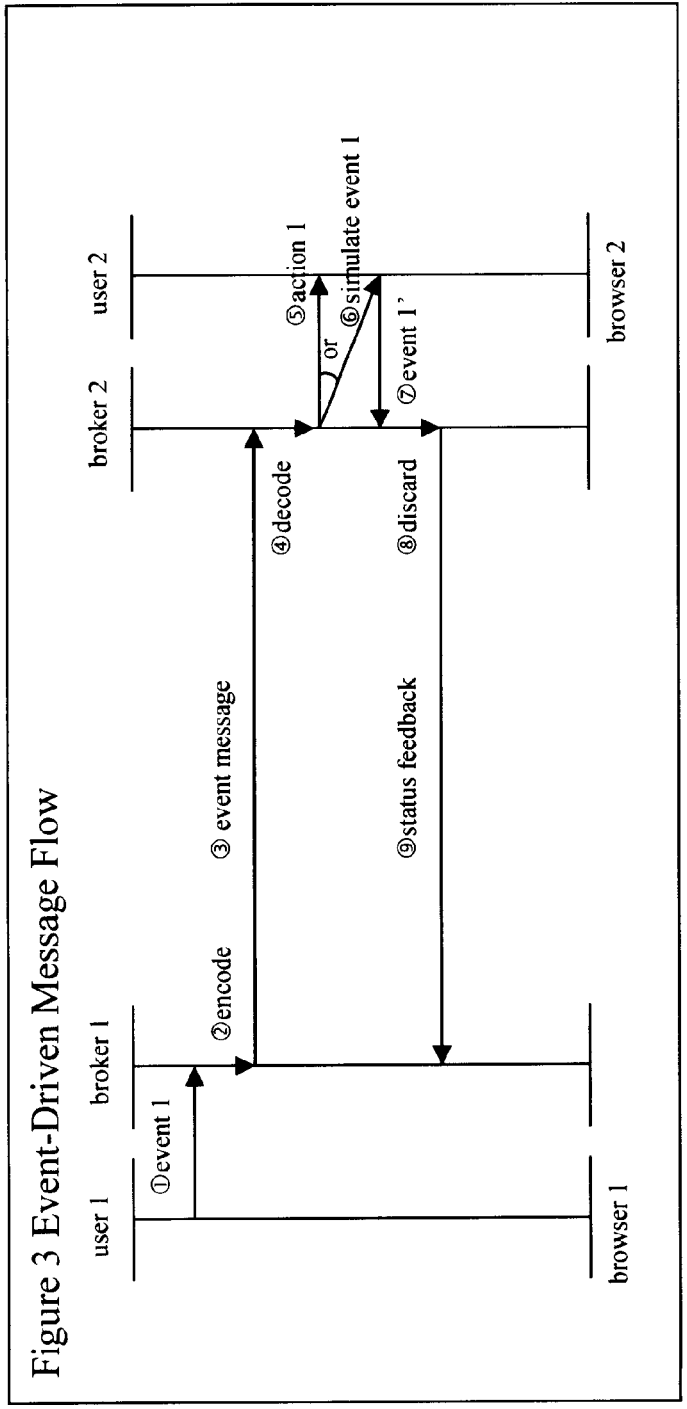
FIG. 3 is a schematic diagram illustrating event-driven message flow within the present invention.

The process of the dialogues is event-driven. The flow of event messages is illustrated in FIG. 3:

(1) An event is initiated by User 1 or programmatically by Browser 1. Broker 1 captures the event.

(2) The event is encoded by Broker 1 in XML, with object references serialized in XPointer expressions.

(3) The XML message for the event can be packaged in a section of a specific instant message format and hence delivered by the underlying IM framework.

(4) The message is received by Broker 2 and decoded back to XML. XPointer expressions are resolved to actual object references of Browser 2.

(5) An action can be taken in Browser 2 on the objects involved to reproduce the same behavior as happened in Browser 1 based on the information in the message. Actions are usually implemented in function calls to the objects in the browser. By way of example, in IE, content manipulation functions from IMarkupServices, IDisplayServices, IHTMLTxRange, and other related interfaces can be used to reproduce the changes. In particular, the IHTMLChangePlayback interface can be used to reproduce the changes as sinked in the IHTMLChangeLog interface. Then the flow goes to step 9.

(6) As an alternative to step 5, a new event can be created programmatically for the XML event message. The new event is marked as "ignore". The event is simulated to fire in Browser 2 to achieve the same actions as happened in Browser 1. The event simulation can be realized in the combination of commands createEventObject and fireEvent for IE 5.5+; or in the combination of createEvent and dispathevent for Mozilla and Netscape 6+.

(7) The simulated event is captured by Broker 2 as Event 1'.

(8) Since the Event 1' was marked as "ignore", Broker 2 recognizes that it is a simulated event posted back from the browser rather than a regular user-initiated event or browser-initiated event. The event should be ignored when captured. Broker 2 will discard the event and prohibit it from transferring further to Peer 1 or any other peers to prevent a potential infinite loop. Otherwise, Peer 1 could end up with responding to the same event more than once. Even though Event 1' is "ignored" by Broker 2, it is still accessible by the browser script engine on the Peer 2 side, and thus available to be scripted inside Browser 2. Browser 2 may respond to the event in the same way that it responds to any other browser events.

(9) Finally, the result of Action 1 or the status of the event simulation is transferred back to Broker 1. This step is optional if the status feedback is not required.

The object resolution algorithm for an XPointer expression in step 4 is realized as the reverse of the XPointer expression construction algorithm. Because the expression represents a path of a sub tree in the DOM, the actual object reference can be re-constructed in a browser by following the path from the root of the sub tree to the final node of the path.

The root of the sub tree is either an object ID or the root of the document. If it is an object ID, the DOM command document.getElementById can be used to locate the root. If it happens to be the root of the document, then the variable document can be used directly. In the case of duplicate IDs, its relative position can be used to further identify the object.

A child of a node n is described as a tag name t with a sibling index i. It can be located by a DOM command n.getElementsByTagName(t).item(i). This command can be used recursively from the root object of the sub tree until the final node is resolved to a DOM object in a browser. The particular portion of the object is further resolved by taking the string-range expression into account.

The XPointer resolution algorithm actually searches the DOM tree to find a sequence of DOM commands that can resolve the original XPointer expression to the final object reference. It is interesting to note that the XPointer expression construction algorithm can be used to generate the DOM command sequence required by the XPointer resolution algorithm directly. For example, instead of generating the expression xpointer(id("card")/p[1]))

the following DOM command sequence can be generated:

document.getElementById("card")
　.getElementsByTagNa me ("P").item(1)

Then the DOM command sequence can be resolved to the referenced object directly by the browser script engine, e.g., a Javascript engine or a VBScript engine. The dedicated XPointer resolution algorithm is no longer needed.

The DOM command sequence can be further simplified by the integration of DHTML object references. This is especially true for HTML Form elements. For example, the DOM command sequence:

document.getElementsByTagName("BODY").item(0)
　.getEle mentsByTagName("CENTER").item(0)
　.getElementsByTagNam e("FORM").item(0)
　.getElementsByTagName("TABLE").item
　(0).getElementsByTagName("TBODY").item(0)
　.getElement sByTagName("TR").item(0)
　.getElementsByTagName("TD"). item(1)
　.getElementsByTagName("INPUT").item(0)

can be simplified to the following DHTML object reference:

document.forms[0].elements[0]

The original XPointer expression construction algorithm needs to be modified for the DHTML object reference integration. While walking backwards through the document tree for a given object reference, if any non-ID element is a Form element, the element will be represented in .elements[i] or element_name, where i is the index of the element in the form's elements array, and element_name is the name of the element if it has been defined (the element_name may also need to be assigned an array index if a duplicate element name is found in the same form). Then from the element the algorithm moves directly to the form object, bypassing any direct or indirect parents in between. The form will be represented as document.forms[i'] or document.form_name, where i' is the index of the form in the forms array of the document, and form_name is the name of the form if it has been defined (the form_name may also need to be assigned an array index if a duplicate form name is found in the same document). The algorithms stops and returns a concatenation of all the representations along the path as the result.

The same simplification applies to images, tables, table elements, maps, anchors, applets, embedded elements, and other elements that have DHTML object references defined.

For Mozilla and Netscape 6+, the invention preferably uses the same event encoding algorithm and the event message flow as illustrated in FIG. 3. The differences are mainly in the way events are monitored and delivered, as is discussed below.

XPCOM, which stands for Cross Platform Component Object Model, is a framework developed by Netscape for writing cross-platform, cross-language, modular software. XPConnect is an additional layer on XPCOM that can marshal XPCOM interfaces into a Javascript engine. Mozilla and Netscape 6+ are built on top of XPCOM.

Mozilla and Netscape 6+ support the DOM2 Event Model. Event monitoring can be achieved at document root level by registering an event listener to each individual event. This is done with addEventListener in Javascript and XPConnect; and with AddEventListenerByIID in XPCOM C++ API. The XML encoded event message and its associated changes can then be packaged in a section of a specific instant message format and hence delivered to the underlying IM framework by an XPCOM call, or be written to an asynchronous socket interface nsISocketTransportService if XPConnect and Javascript are used.

When the event message reaches another Mozilla or Netscape 6+ peer, an action can be sent to the browser to reproduce the same behavior based on the message. Again, the action is generally implemented in function calls to the involved objects in the browser. When event simulation is required, a PostEvent call preferably will be used with XPCOM; or a DOM2 event dispathEvent is called from Javascript.

Some user actions may generate overwhelming numbers of events. To save system resources and network bandwidth, "useless" events can be filtered out in step 1 before being propagated to peer browsers. For example, events on disabled objects should generally be filtered. Also, events that bubble all the way to the top of a document without a user-defined handler or a system default handler should generally be filtered. Furthermore, a series of continuous events can be combined to one logical event. This is especially useful on the events like onmousemove, ondrag, onresize, onscroll and onselectionchange. If desired, the decision on which event to filter can be made configurable to end users.

6.4.1.2 HTTP, XML-RPT, and SOAP

When the browser-broker connection is implemented in HTTP, a broker acts like an HTTP server. A call request will be mapped to a browser pull, and a notify request will be mapped to server push.

Referring now to FIG. 2, when Peer 1 issues an edit action in Web Browser 1, the browser sends a pull to Broker 1. Broker 1 forwards the request to Broker 2. Broker 2 then pushes the edit results to Browser 2.

This case also includes more recent protocols of XML-RPC (Remote Procedure Call) and SOAP (Simple Object Access Protocol). Should a browser use SOAP or XML-RPC to communicate with a broker, the interactions follow the same pattern as that of HTTP.

Because of the asynchronous nature of interactions, push becomes important in any implementation of the browser-broker connection. HTTP, XML-RPC, and SOAP are basically pull protocols. They are not designed for push.

One way to get around this problem is to automatically issue pull directives in a browser at human unnoticeable intervals (half a second, for example) so as to get new messages from its broker. An obvious disadvantage of this procedure is the waste of bandwidth for all those idle intervals when there are no new messages. It generates too much network traffic.

Another way to get around the problem is to host a small Java applet, ActiveX component, or a Javascript scriptlet with a hidden frame/iframe into a Web page. The Java applet or the ActiveX component has network connection capability to receive push messages or notification of push messages from the broker. The problem with this approach is that the browser has to be Java or ActiveX enabled. Not all the browsers have Java or ActiveX switches turned on. The scriptlet solution downloads push contents though a hidden frame or iframe. Though independent of Java or ActiveX, it is still tied to the Web page.

The third way to address the problem is to maintain a persistent connection between a browser and a broker. It maps to HTTP/1.1 protocol with persistent connection built in, HTTP/1.0 protocol with a "Keep-Alive" option, a persistent CGI connection, or a server-specific connection. Push action is then realized by streamlized server writes. A disadvantage of this method is that a persistent connection needs to be maintained all the time, leading to poor scalability.

A problem common to all three of the methods discussed above is that the communication logic has to be implemented into the Web pages involved. Only pages with the pull logic, Java or ActiveX components, or streamlization logic built-in can be used for communication. By comparison, the COM and XPCOM approaches do not rely on any pre-built logic in a Web server or a Web page. They are independent of any Web server and any Web page.

6.4.2 Broker-to-Broker Connection

The broker-broker connection can be implemented on any peer-to-peer messaging framework, to the extent that unique peer addressing and instant message delivery are supported. A message adapter will need to be created for each IM transport, given the diversity and lack of standard of the current Instant Messaging systems.

The invention makes no assumption about the communication protocols between brokers. The broker-to-broker messages can sit on a number of communication "wires", including Microsoft COM/DCOM/COM+; MQ series; Microsoft Exchange Server extensions; Microsoft .NET Remoting and Unified Event Model; Web Services; IBM MQ Series; Instant Messaging protocols like Jabber, ICQ, AOL IM, Microsoft MSN Messenger, and Yahoo! Messenger; peer-to-peer frameworks like Sun JXTA; etc.

Referring to the ISO 7 layer network model, the broker-to-broker communication can be implemented on protocols like UDP and TCP; or on higher application protocols like HTTP, BEEP, XML-RPT, or SOAP.

Significantly, when it comes to synchronizing, only content changes (deltas) need to be transmitted, not the entire contents in the browser. The delta synchronization is made possible by browser event monitoring and DOM Element ID/XPointer Expression addressing as described above. This leads to lower bandwidth requirements and higher system performance.

XML is the preferred message format for implementing the invention, although other message formats like those used in MSN, AOL, and Yahoo messengers, etc. can be used as well. The invention preferably uses XML to encode delta changes transmitted between brokers. Editing, selection, formatting, cursor and mouse movement, and any other related browser actions implemented by the user, are packaged and represented in XML and exchanged between the participating brokers.

If a broker is not up or not available when another broker is sending it a message, the message can be stored in the sending broker or some other intermediate servers on the network. The message can then be forwarded to the receiving broker when the receiving broker becomes available again. Such store-and-forward capability will generally be provided by the underlying IM framework and this invention makes no specific requirements on message storage.

6.5 Some Specific Technical Issues

This section details a few technical issues and their preferred solutions in the present invention.

6.5.1 Embedded Objects

It is common to see Java applets and ActiveX controls as embedded objects in browsers. With specific plug-ins and extensions, browsers can also be used to handle markups other than HTML. Markups in Scalable Vector Graphics (SVG), for example, can be displayed in both IE and Netscape when an SVG viewer is installed.

Can embedded objects take part in the browser-to-browser communication like regular HTML DOM objects? The answer depends on how an embedded object exposes its interfaces to the host DOM.

More particularly, there are two possible scenarios. One scenario might be called the "black box" scenario, in which the embedded object exposes only a specific set of properties and procedures to the host DOM. Events from the embedded object might be available to the host environment. Callback functions are usually used to handle the events. The components inside the embedded object are generally inaccessible from the outside.

Examples in this category include the Microsoft Media Player, the Microsoft Visio ActiveX plug-in, the Macromedia Flash Player ActiveX control and Java applet, and the WildTangent Web Driver Java plug-in for 3D graphics and games.

Another scenario might be called the "white box" scenario in which some or all of the components of the embedded object are accessible from the host environment through a DOM. It is likely that the embedded DOM and events will use compatible classes and data structures of the host DOM. At the other extreme, however, the embedded DOM and event structure may reflect a completely different implementation. In many cases, a "white box" scenario is not so "white". There are visible boundaries in DOM navigation, manipulation, and event bubbling.

Examples in this category include Mozilla's support for MathML and SVG, IE5's support for VML, HTML+TIME (a kind of SMIL), the Adobe SVGViewer plug-in, and the Macromedia Flash Player implemented in IE 5.5's behavior.

6.5.1.1 The "Black Box" Scenario

The "black box" scenario implies that there is no generic solution for enabling the embedded objects of the "black box" category to participate in the browser-to-browser communication; a particular solution will be case specific. However, as will be seen below, solutions do tend to follow a general pattern.

The Macromedia Flash Player ActiveX control, for example, exposes a scripting API for Flash movies and audio. Movies can be played, zoomed, panned, paused, and stopped. Their properties can be queried and set. Though Flash movies generate events when a user clicks a mouse button or hits a key, these events are generally contained inside the player. The host DOM cannot intercept them.

On the other hand, Flash movies can be designed to release events to the host environment with the scripting commands getURL and FSCommand. More particularly, an event can be intercepted in its callback functions, where it is packaged with extra information like media type and movie ID, and then re-posted as a browser event. In IE 5.5+, the re-post action is realized in the combination of createEventObject and fireEvent. In Mozilla and Netscape 6+, it can be realized in the combination of createEvent and dispathEvent. A broker then captures the re-posted event the same way as it captures regular DOM events. The event will then be encoded by the broker and shipped to other peers.

When the event message reaches another broker, it will be recognized as a Flash movie event based on its media type. In this example, it will be a flash movie. The event cannot be simulated as a regular HTML DOM event, however, because for the current Flash player there is no way to post any external event to a Flash movie programmatically from the host DOM. Instead, the host environment needs to interpret the event as a Flash movie command. The command will be issued to the corresponding embedded Flash movie object from the host document in order to achieve the same action as that in the originating browser. This can be done by, for example, a Javascript function, because the event is accessible to the script engine of the browser.

Figure 4:
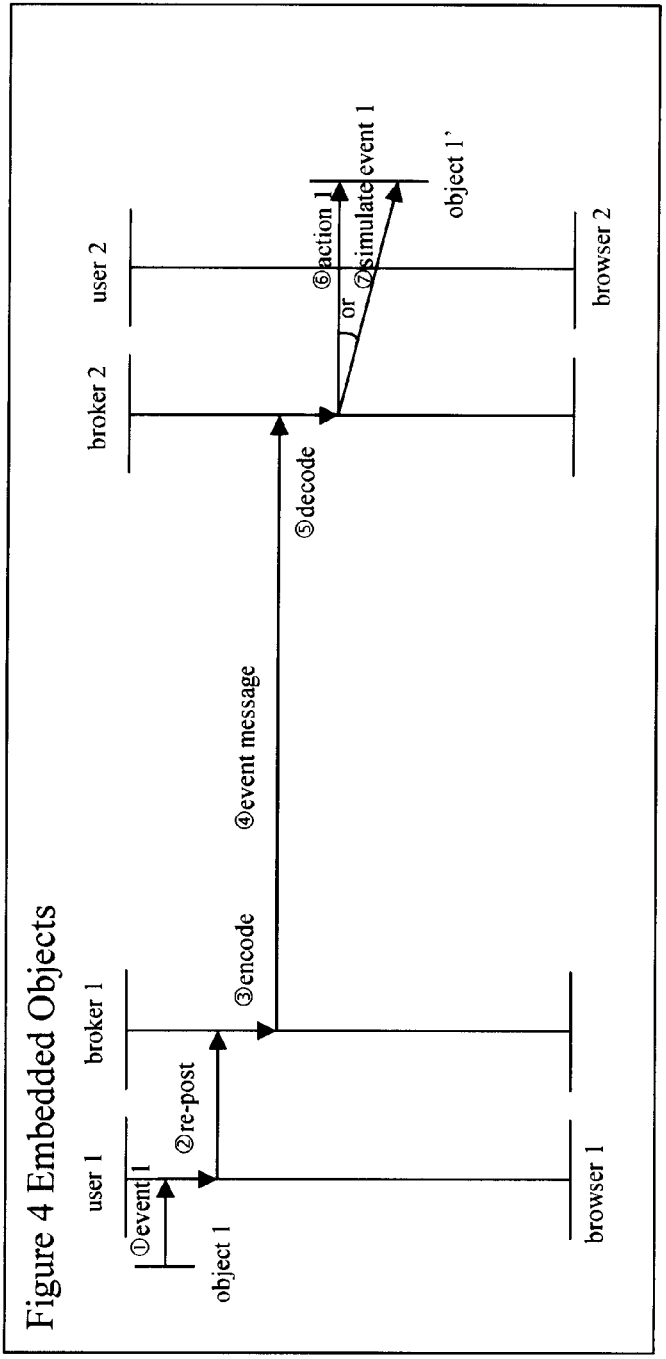
FIG. 4 is a schematic diagram illustrating the event flow for embedded objects within the present invention.

The event flow can be found in FIG. 4 by following steps ①, ②, ③, ④, ⑤, and ⑥.

The re-posting of an event can be avoided if the browser can intercept events from the embedded objects directly.

Java applets can be made to participate in the browser-to-browser communication by following the same pattern as shown in FIG. 4.

Public properties and methods of an applet can be directly accessed from Javascript. Again, a Java applet needs to issue callbacks to the host environment to expose events. Then the events can be re-posted from the callback functions to the browser. A subtle difference here is that a Java applet usually runs on a different thread than the host DOM dispatch thread. Event posting is preferably made to the host DOM dispatch thread in order to be seen by a broker.

An application of this type is the WildTangent Web Driver Java plug-in. A 3D graphics application, originally written for an individual Web page, can be controlled and manipulated by its peer browsers if its objects and events are exposed to the host environment. The public properties and methods of the Java applets are exposed to the host document by default. The Java events, initiated either by the user or by the applet, then need to be intercepted within the Java code and re-posted to the browser.

The requirement of object exposition and event re-posting of the "black box" category appears to be a limitation when browser-to-browser communication is concerned. The costs are small, however, if compared to the implementation costs of a full-fledged peer-to-peer application. In the situation of the Flash Player, the audio and movies from one browser will become shareable and controllable from another browser, if the solution as described above is followed. This is much simpler than writing a socket-based Flash application for the same purpose. The objects and events exposed to the host environment work like "external jackets" on a cassette player. The invention provides "connectors" and "wires" for the "players" to talk to each other.

6.5.1.2 The "White Box" Scenario

The "white box" scenario involves embedded DOM objects. The degree of their participation in browser-to-browser communication is determined by the level of integration of their object models and event models to the host document. Specifically, the following features are generally considered:

(1) Object Visibility: Embedded object handle, internal object identity and location, property query and structure navigation, from host DOM to embedded DOM, and from embedded DOM to host DOM.

(2) Event Propagation: Event capture and bubbling across the embedded DOM boundary.

(3) Inheritance of Cascade Style Sheets (CSS): Pass down CSS properties of host DOM to embedded DOM objects.

For a simplest case, the embedded DOM and the host DOM are implemented by the same code and seamlessly integrated. This includes Mozilla's support for SVG and MathML and IE5's support for VML and HTML+TIME (a kind of SMIL). The embedded objects can participate in the browser-to-browser communication in the same way as any other HTML DOM objects.

For the case of visible DOM boundaries, the solution is case specific. However, it follows again the same message flow as illustrated in FIG. 4.

Adobe SVGViewer exposes a DOM2 API that allows JavaScript, Visual Basic, and C/C++ COM clients to add, query, modify, and/or replace nodes within the underlying XML DOM tree created by the SVG parser. The implementation currently falls short, however, on its event integration. First, an event in the SVGViewer does not propagate to the host DOM. Second, there is no way to post any external event to the SVGViewer from the host document.

The SVGViewer does, however, allow the host DOM to register event listeners to embedded SVG graphics. An SVG event can thus be intercepted in a listener of the host DOM. The object references of the event can also be encoded in the same kind of XPointer expression as described above because of the existence of SVG DOM structure. Then the event can be re-posted as a browser event with the XPointer expression attached. A broker captures the re-posted event in the same way as regular HTML DOM events and ships the event to other peers.

When the event message reaches another broker, it will be interpreted as an SVG command and an action can be taken from the host DOM to reproduce the same behavior to the embedded object. This can be done by, for example, a Javascript function, because the event is accessible to the script engine of the browser.

The event follows steps ①, ②, ③, ④, ⑤, and ⑥ in FIG. 4.

The DOM2 standard recommends a command createEvent for new event creation and a command dispatchEvent for event posting. SVGViewer has not implemented these commands yet. Otherwise, they can be used to re-create an event and post the event back to the embedded SVG object, as illustrated in FIG. 3 at step ⑦.

Standardization efforts known as DOM3 discuss the requirements and framework for using multiple implementations of DOM or DOM-based APIs designed for a particular markup language within a single standard DOM application. One of the requirements is to make documents that are handled by two or more DOM implementations work together as seamlessly and compatibly as possible. It would be desirable for the boundary between embedded DOM and host DOM to be minimized, and for events and CSS properties to propagate automatically across the boundary. The present invention will find easier implementations as DOM3 matures and as more vendors conform to the standard in their embedded DOM implementations.

6.5.2 Delta Synchronization

Generally, four types of changes can occur to a page in a browser:

(1) Content changes are the results of edit operations like add, change, delete, copy, cut, paste, undo, and redo;
(2) Style changes are the results of format operations like bold, italic, underline, spacing, color, font, border, align, indent, margin, box, position, and size changes.
(3) View changes are the results of focus change, selection change, caret move, mouse move, tab move, scroll, page down, page up, page home, page end, and window resize; and
(4) Navigation changes are the results of link browsing, form submitting, or any actions that cause a browser to load a page.

The changes can be initiated by keyboard inputs, mouse clicks or from any other input devices. The changes can also be generated programmatically inside a browser. The changes must be carefully synchronized to ensure a consistent view of the same content among all peers.

DOM and XPointer expression plays an important role in change synchronization of all four types of changes. The synchronization process follows the event flow of FIG. 3.

In content changes, a DOM/XPointer expression helps identify the source object of a change event. The identity can be packaged with the XML encoding of the event along with the edit changes. Edit changes can be encoded with the changed text along with the beginning and ending positions of the range of HTML/XHTML/XML text in the parent object or the container in which the changes occurred. When the event is carried over to other peers, the XPointer expression will be resolved to the same object at the same positions, and the content changes will be reproduced. The event with the changes can be re-posted over the object and the status of the object is thereby synchronized. The synchronization only touches the actual object involved and only the differences of the text are applied. This is the essence of delta change synchronization.

Styles are defined in the standards Cascade Style Sheets CSS1 and CSS2. Although styles are implemented slightly differently in different browsers, Style changes generally follow the same path as content changes. Style changes of the involved object are packaged with its XPointer expression to the XML encoding of the event.

View change synchronization is required when an end user wants to show precise movement to others, or wants to give view control of the browser to another peer. DOM and XPointer expression helps in identifying object focus and caret position. Selection needs special care in the XPointer encoding algorithm since more than one object may participate in a selection. The algorithm needs to find a common parent of the selected object(s) in the DOM tree as the basis of the expression, and use the beginning and ending positions of the selection for the synchronization. Page scroll and window resize changes involve a viewpoint change of a page. It is important to determine the top or bottom of the viewpoint and have one of these attributes encoded in the XPointer expression. Then the viewpoint can be synchronized either to the top or to the bottom. Mouse movement usually involves mouse cursor coordinates. Due to the differences in browsers, browser configurations, and browser window sizes, specific coordinates in one browser may not have proper correspondence in another browser. However, DOM and XPointer expressions again can be used to find the actual object the move is currently on. With the addition of relative offsets of the mouse coordinates relative to the current object, the precise position of the mouse can be determined in peer browser windows. The mouse movement can then be replayed on the corresponding object of the peer browsers.

Navigation changes occur when a browser is loading a page to the current window or starting a new window. Simple "URL following" is easy to replay in peer browsers if the browser fires a navigation event. For example, suppose IE fires a BeforeNavigate2 event on its WebBrowserEvents2 interface. The event can be captured with the target URL information. For Netscape 6+, a similar event can be captured at the document root level.

When an HTML form is submitted using the HTTP GET method, the data are retrieved from the URL argument. When an HTML form uses the HTTP POST method, the data are not associated with the URL. However, for IE, the data can be accessed via the arguments of the BeforeNavigate2 event. For Netscape 6+, it is possible to loop through the form fields to obtain the same set of data. This data can then be encoded with the XML message of the submission event and synchronized among peers.

A full synchronization also needs to consider cookies and information in request headers, either for a simple URL navigation, or for a form submission. Cookies and headers can be extracted, packaged, and delivered to peers the same way as HTML form data.

6.5.3 Concurrency Control

Concurrency control is typically needed since more than one peer may be accessing the same page (or a same portion of a page) at the same time. The actions need to be serialized so as to ensure data consistency among concurrent users.

Delta synchronization helps the invention achieve a maximum concurrency, since an operation to a page only touches the objects that are actually involved in the operation. The portion of the page that must be controlled for concurrency is thus kept to a minimum.

Still, access conflicts can occur when two or more users are updating the same object in a page. Concurrency control needs to be ensured at individual DOM object level.

Conventional methods like locks and timestamp ordering can be used to ensure concurrency control. A lock can be applied to an object that is under updating such that all of the peers get the same updates before the lock can be released. Timestamp ordering uses timestamps to order actions that access the same object according to their starting times.

Figure 5:
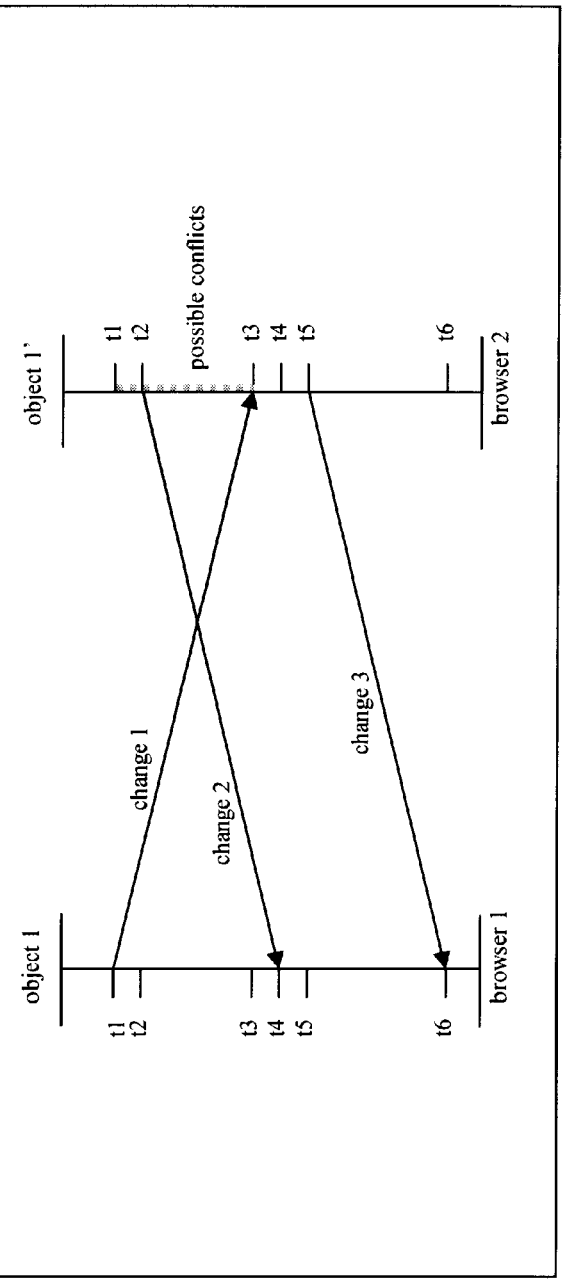
FIG. 5 is a schematic diagram illustrating timestamp ordering concurrency control within the present invention.

FIG. 5 illustrates a version of the Timestamp ordering concurrency control algorithm tailored for the event-driven message model of the invention. The algorithm assumes that a base time synchronization can be established among the participating peers before the algorithm starts.

More particularly, FIG. 5 shows an Object 1 in Browser 1 and its correspondent Object 1' in Browser 2. Change 1 occurs to Object 1 at t1 and arrives to Object 1' at t3. Change 2 happens to Object 1' at t2 and arrives at Object 1 at t4. Change 3 happens to Object 1' at t5 and arrives at Object 1 at t6.

Possible conflicts can occur between t1 and t3 on the changes to Object 1', when Change 2, for example, happens before Change 1 arrives. The time period between t1 and t3 is commonly caused by network latency.

Each change is assigned a timestamp when it starts. It is assigned an ending timestamp when it arrives at another peer. The timestamp ordering algorithm detects the period of possible conflicts using the timestamps, and abandons any conflict changes or prompts the peer for a resolution.

When Change 2 arrives at Object 1, its timestamps are compared to the timestamps of the last action to the same object. For the case here, the action is Change 1. A conflict occurs when the following evaluates to true:

$$t2-t1 \leq t3-t1 \tag{1}$$

The formula needs the arriving time t3 of Change 1 to be available for the evaluation. Generally, it is impractical for a peer to know when a change will arrive at other peers. An approximation can be made, however, by assuming that the latency for an outgoing change is the same as that of an incoming change. For Change 1 and Change 2, the assumption is:

$$t4-t2=t3-t1 \tag{2}$$

Combining formula (1) and (2) will result in formula (3) as follows:

$$t2-t1 \leq t4-t2 \tag{3}$$

Since t1, t2, and t4 are all available when Change 2 arrives, the conflict caused by the change can now be effectively detected.

The same algorithm can be applied to Change 3 with a substitution of t5 to t2, and t6 to t4 in formula (3). Change 3 will then be accepted as a valid change.

6.5.4 Tool Injection

In the context of the present invention, a "tool" is defined as a set of methods, functions, or software modules used to manipulate the contents and embedded objects of a browser. These tools should be accessible from the browser. In an extreme case, a tool can be a full-scale application that works with the browser. Tools can be implemented in Javascript, VBScript, Java, C++, or any other language that is understandable and accessible by the participating browsers.

The browser-to-browser model of peer-to-peer communication makes it possible for one peer to push any content and media to other peers. Javascript functions, ActiveX controls, Java applets, and various plug-ins, traditionally bound to a particular page, can now be detached and sent to peer browsers in the same way as regular HTML contents. The tools defined in one browser become immediately available to work on the contents displayed in other browsers. This is sometimes referred to herein as "tool injection".

Tool injection typically occurs at three different levels in the present invention:

(1) Scripts. Tools in scripting languages like Javascript and VBScript, combined with CSS style sheets and HTML/XHTML/HML contents or other special markups like SVG and MathML, can be pushed over to peers.

(2) ActiveX controls and Java applets. Tools in embedded objects like ActiveX controls and Java applets can be pushed over to peers.

(3) Plug-ins. The installation process of Plug-ins can be initiated from a peer browser.

Script functions can be used to respond to events or to manipulate contents in a browser. An example would be a Javascript word count package which, when pushed over to a page in an IE or a Netscape browser, can allow the browser to count the number of words used in the browser document. A more complex example would be to push a complete toolbar, with standard editing and formatting functions, to a browser window to allow a peer to edit the HTML contents of the document. An SVG drawing tool can be pushed to a browser window to allow a new SVG drawing to be created on the current browser document or to make the existing SVG graphics in the document editable with the toolbox.

ActiveX controls and Java applets can be pushed over to peers to accomplish a specific task. For example, a peer can send a live chessboard applet to another peer in order to allow peers to play chess together.

The contents of a special markup or in a special type may need a plug-in to work. The plug-in installation may be initiated by a peer when that peer pushes over the contents of the special type or markup to the browser of the current peer. The current peer will then be prompted by the browser to start the downloading and installation process. For example, when a peer receives a Flash movie and there is no Flash player currently installed, the user will be prompted to install the player. Each broker may collect tools and place the tools to its local toolbox. To manipulate the contents in the browser, different tools may be enabled to work on different types of contents. When one broker has a tool that the others do not have, the broker can negotiate and decide to share the tool by pushing the tool over from one browser to another. The present invention employs an algorithm for automatic tool negotiation and installation.

Figure 6:
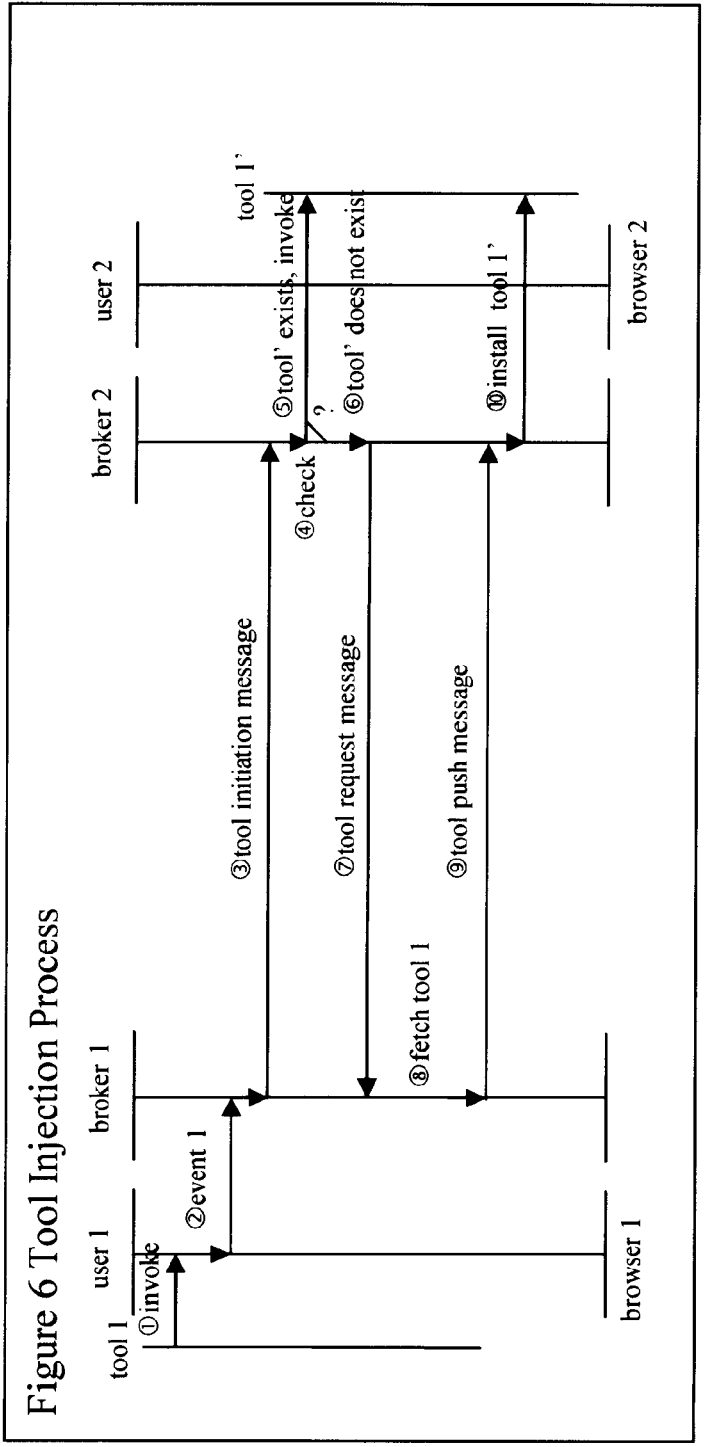
FIG. 6 is a schematic diagram illustrating the tool injection process of the present invention.

The process is illustrated in FIG. 6.

(1) Tool 1 is invoked by User 1 or programmatically by Browser 1.
(2) The invocation generates Event 1. Broker 1 captures the event.
(3) The event is encoded in XML and delivered to Broker 2.
(4) Broker 2 checks if the corresponding Tool 1' exists in Broker 2 or not.
(5) If yes, it is invoked to Browser 2. The algorithm finishes.
(6) If no, Broker 2 generates a tool request message to Broker 1.
(7) The request is delivered as an XML message.
(8) If Broker 1 approves the request, it fetches Tool 1.
(9) Tool 1 is packaged in an XML message and delivered to Broker 2. The message is a plain XML message if the tool can be serialized into XML; otherwise, a binary attachment may be used in the delivery.
(10) The tool is installed by Broker 2 as Tool 1'. The tool can now be used directly in Browser 2.

The tool existence detection in step 4 can be realized in two ways. In the case of tools for Java applets and ActiveX controls, the browser will be able to fetch (i.e., download) the tools directly or prompt the user for an approval before downloading. This feature is generally provided by browser implementations. However, the invention adds a new dimension, where the peer can initiate the process. As a result, the invention can effectively make use of the browser to do the tool injection.

The second way of tool existence detection is specifically for script tools, styles, and special markups. They are pushed over to peers as regular HTML or XML contents. A special tool profile needs to be created to mark the contents as a tool. The profile can be bound to the tool invocation event when the tool gets invoked. The tool name, attributes, version, and other related information should be included in the profile and encoded into the event message. When other peers get the message, they will be able to determine if they support the tool or not based on the profile.

The tool approval in Step 8 is typically made by the participating peer. It can also happen automatically by configuration if desired. In the case where the tool cannot be shared and the tool is an embedded object, the broker can make a pure information viewer in place of the embedded tool, such that its contents can still be viewed in its browser.

6.5.5 Peer Position Indication

For browser-to-browser, peer-to-peer applications, it is important to determine and show the screen positions of each participating peer, so that one peer is able to know what the other peers are doing when they are working on the same Web page.

The five basic types of screen positions that can be identified for a browser window are:

(1) Edit caret;
(2) Selection;
(3) Mouse cursor;
(4) Viewport; and
(5) Focused element.

A position change in any one of the foregoing screen position types in one peer browser needs to be carried over to the other peer browser(s) whenever position indication is required.

Position changes and position synchronizations were discussed above in the delta synchronization section. This section provides details on preferred implementations on position indications. For the purposes of this discussion, the reference browser will be assumed to be Microsoft Internet Explorer version 5 and up (IE5+), although other browsers may also be used. Javascript syntax is used if not otherwise specifically stated.

6.5.5.1 Caret

In IE5+, a position change of an edit caret will trigger the document level event onselectionchange. A selection object is created that can be referenced as document.selection. A range object then needs to be created out of the selection object in order to move the caret position from one browser to another.

Peer caret position indication across browsers preferably follows the same event-driven process as shown in FIG. 3, which has been adapted to the case as follows:

(1) A caret change triggers an onselectionchange event in IE5+ which can be captured by a broker.
(2) The broker creates a range object out of the selection object by a command document.selection.createRange( ).
(3) A range object for a caret position is determined by the range's direct parent element and the range's start offset. They are essentially the startContainer and startOffset properties as defined in the Document Object Model (DOM) Level 2 Traversal and Range Specification. In IE5+, the direct parent is found by parentElement() if the range is a text range, or by commonParentElement() if the range is a control range. For a text range, the start offset will be the number of characters from the beginning of the parent element to where the caret lies. The offset can be calculated by the combination of the move(), moveStart() and compareEndPoints() methods of the range object. The range can then be encoded with the XPointer expression of the parent element along with the start offset. The algorithm for the XPointer expression construction is preferably the same as described in the browser-broker connection section above.
(4) The encoded range is moved over to other peers by the underlying instant messaging framework.
(5) The direct parent element and the start offset of the range can be decoded from the XPointer expression with the object resolution algorithm described above.
(6) A text range can be re-created in two ways. First, it can be created from the decoded parent if the parent supports the createTextRange() method; otherwise, document.body.createTextRange() can be used to create a document wide range. The MoveToElementText (p) construct will narrow the range to the decoded parent element p. Then the move(), moveStart(), or moveEnd() methods of the range can be applied to the decoded offset so as to move the range to the actual position of the caret. A control range can be re-created directly from the decoded parent in createControlRange() method.
(7) The re-created range for the caret is invisible in the peer browser until it is represented in a visual form. A blocked div element, for example, can be used for display. For each caret, the peer broker can push an absolute positioned div element to the Web page and bind the position of the div to the position of the re-created range. The div will now be able to show a caret position. For IE5+, insertAdjacentHTML() can be issued from the broker to push a div to the end of document.body:

```
<div id="peer_id_caret" style="{
    position: absolute;
    left:expression(r.getBoundingClientRect( ).left +
            document.body.scrollLeft -
            document.body.clientLeft);
    top:expression(r.getBoundingClientRect( ).top +
            document.body.scrollTop -
            document.body.clientTop);
    width:1;
    height:expression(r.boundingHeight);
    font-size:0; border:1 solid black;
}"></div>
```

This div block is bound with range r as re-created above and changes its position whenever the caret position of the original peer is changed. The left, top, width, and height expressions in the div style guarantees that the div is positioned to the right place whether the caret is in a text input, in a textarea, or in any other editable content. It will also maintain the right position when the text is scrolled or resized. The implementation of the left, top, and height expressions uses an IE specific feature called dynamic properties, such that any positional change in the range object can be automatically propagated to the blocked div. The same effect can be achieved in Netscape 6+ with callbacks.

Other properties of the style can be used to specify the visual effects of the caret such as border width or background color. These properties can be made to be user configurable. It is interesting to note that the div can be personalized with a transparent background image of the peer at or near the caret position, thus making it possible to show a "roster" directly to the place where an edit action has happened.

A clip property needs to be added to the style when the caret lies in a scrollable edit area. The caret needs to be hidden when it is scrolled off the viewport. The same issue happens to selections. This will be discussed in the next sub-section.

An essential part of the caret indication process is the encoding and decoding of a range object. For IE5+, a range can be efficiently represented in a bookmark if it is within the same document of a browser. The method getBookmark() returns an opaque binary string of a range which encodes all the information of the range. The method moveToBookmark() can then reconstruct the same range from the bookmark. Unfortunately, the bookmark in one browser becomes invalid when shipped to another browser. There is currently no Application Programming Interface (API) available to the public to reconstruct the bookmark from a browser on a different browser.

The same visual representation of the caret can also be achieved with an absolute positioned IMG object, a VML graphic shape, or other graphic objects, with their corresponding positions defined the same way as the div element.

The Peer Caret Position Indication process not only ships one peer's caret position to another, but also facilitates cross-browser editing. Since a peer position in a browser is bound to a range object, the edits at the caret position of the original browser, when moved over to the peer browser, can be directly applied to the range object. The command is pasteHTML, or execCommand with a proper command identifier.

6.6.5.2 Selection

A selection of a portion of a browser document is contiguous and consists of the content between two end points. A selection returns a range object that describes the selection. In bi-directional writing such as Arabic or Hebrew, several range objects may be returned from a single selection. This sub-section focuses on the case of single range object, though the result can be extended to the case of multiple range objects as well.

In the W3C DOM2 Range Specification, a range object consists of two boundary points corresponding to the start and the end of the range. The start of the range is defined by startContainer and startOffset; the end of the range is defined by endContainer and endOffset. A range also has a commonAncestorContainer for the content of the range.

In IE5+, a selection change triggers an onselectionchange event, in the same way as a caret position change. The range object returned from the selection then needs to be used to move the selection position from one browser to another. The process is substantially the same as that of the Peer Caret Position Indication: the principal difference is that the range object for a caret position has its start and end boundaries collapsed to the same point, whereas the range object for a general selection has two separate end points.

In IE5+, the start of a range r can be determined by r.collapse( ), which returns a single point range r1. The end of the range r can be determined by r.collapse(false), which returns a single point range r2.

There are two ways to move the position of a selection across browsers:

1. Use the range object r from the selection directly; or
2. Use the two range objects r1 and r2 created from r's two end points.

The first approach involves the encoding of the range object r with its parent element, the start offset and the end offset. The process for encoding of the parent element and the start offset was described in Step 3 of the last sub-section. The end offset can be calculated in the same way as the start offset.

The second way involves the encoding of the two range objects r1 and r2. Both of these range objects are single point ranges and can be encoded solely with their parent element and start offset. The process is the same as that described in Step 3 of the last sub-section.

In some ways, these two approaches are essentially the same, because one can easily determine r1 and r2 when r is given; or determine r when r1 and r2 are given. A practical difference, however, is that the second approach is less sensitive to changes in the document.

Figure 8:
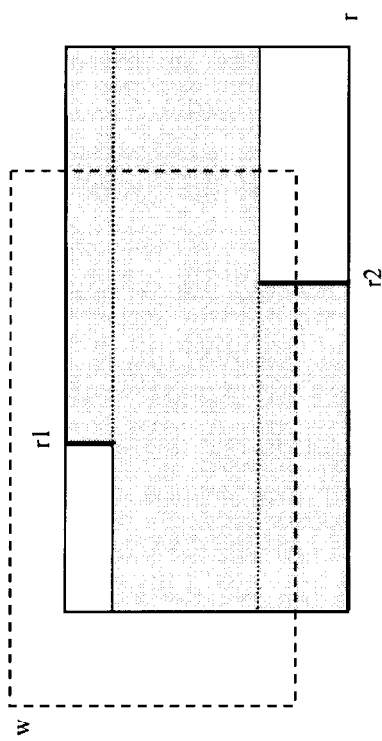
FIG. 8 is a schematic diagram illustrating peer selection indication with the present invention.
Figure 12:
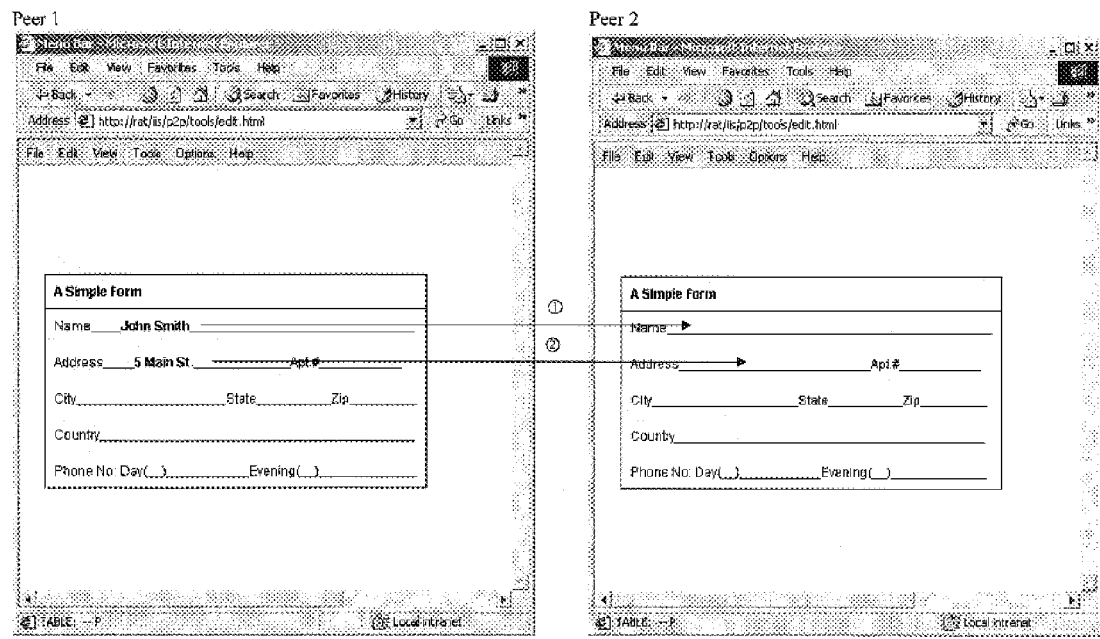
Figure 14:
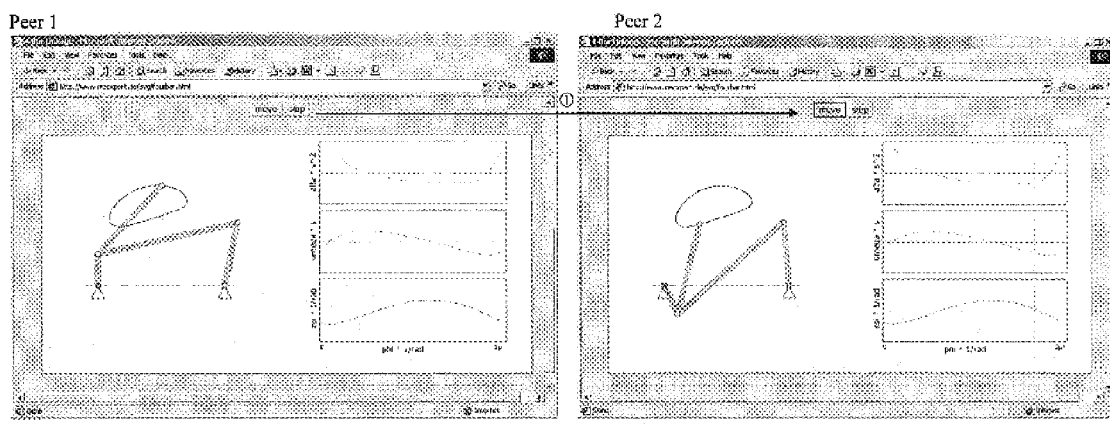
Figure 16:
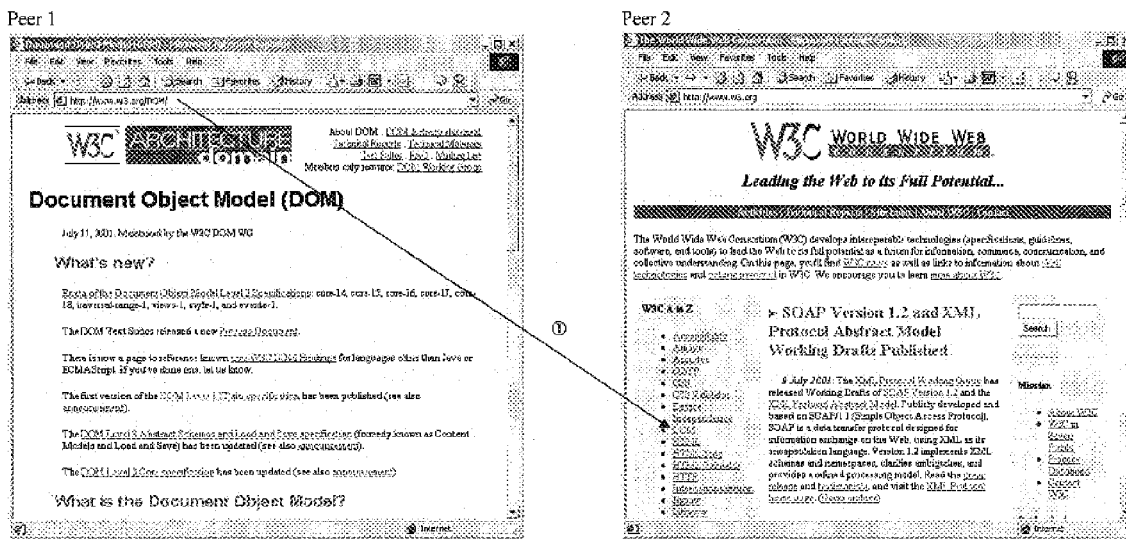
Figure 19:
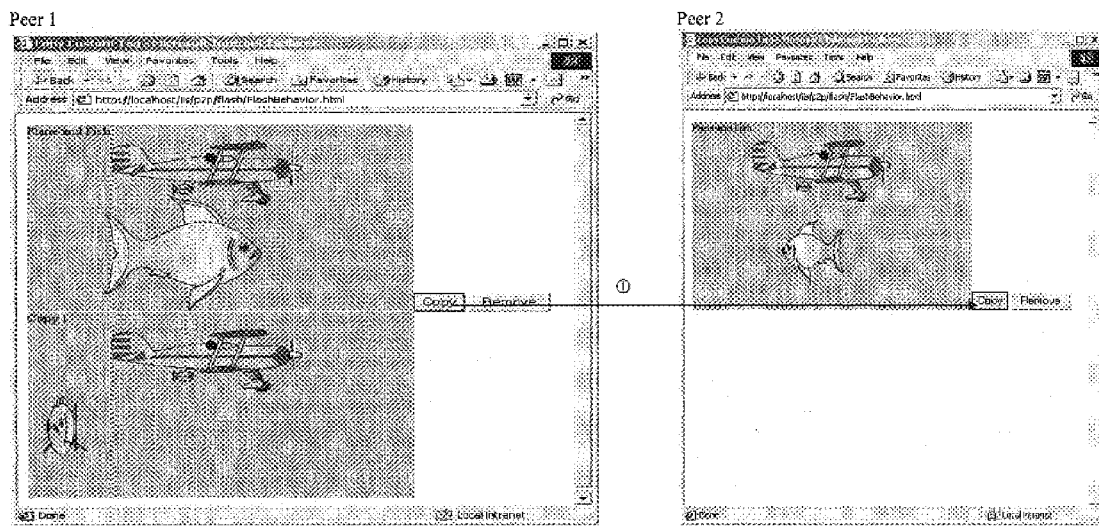
Figure 21:
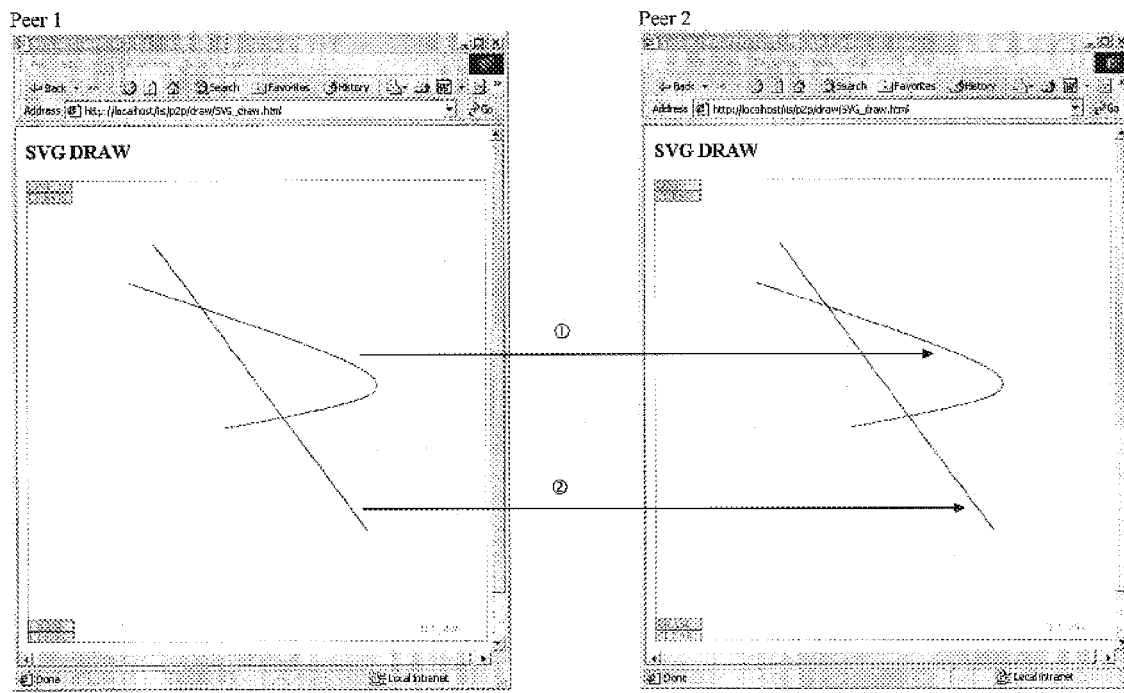

When the representation of the range object or objects are moved over to a peer browser, they can be reconstructed as before and a visual form needs to be created to make the selection visible. Again, blocked div can be used. This is illustrated in FIG. 8. The shaded area indicates the range of the selection. It is indicated as r. r1 and r2 are two single point ranges for r's start and end points.

The peer broker can push an assembly of absolute positioned div elements to the Web page and bind the position of the div to the position of the re-created ranges. The div elements will cover the same shaded area in a peer browser.

One approach is to have two div elements, one to indicate the start point of a selection and the other to indicate the end point of a selection. In IE5+, the following two div elements will put a pair of brackets "[" and "]" to mark a selection:

```
<div id="peer_id_selection_indicatior1"
style="{position:absolute;font-size:0;border-left:2
solid blue;border-top:2 solid blue;border-bottom:2
solid blue;
        left:expression(getLeft(r1));
        top:expression(getTop(r1));
      width:4;
  height:expression(getHeight(r1));
    clip:expression(getClipRect(r1));
}">
</div>
<div id="peer_id_selection_indicatior2"
style="{position:absolute;font-size:0;border-right:2
solid blue;border-top:2 solid blue;border-bottom:2
solid blue;
        left:expression(getLeft(r2));
        top:expression(getTop(r2));
      width:4;
  height:expression(getHeight(r2));
    clip:expression(getClipRect(r2));
}">
</div>
```

The positions of the div elements are calculated from the positions of the re-created range objects. Given a range r, its left, top, width, and height may be calculated with the following Javascript functions:

```
function getLeft( r ) {
    return (r.getBoundingClientRect( ).left +
        document.body.scrollLeft -
        document.body.clientLeft);
}
function getTop( r ) {
    return (r.getBoundingClientRect( ).top +
        document.body.scrollTop -
        document.body.clientTop);
}
function getWidth( r ) {
    return r.boundingWidth;
}
function getHeight( r ) {
    return r.boundingHeight;
}
```

The left, top, width, and height expressions of each div element are dynamic properties based on the above function; their values change automatically when the underlying ranges change. The expressions work to guarantee that the div elements are positioned to the right place whether the selection is in a text input, in a textarea, or in any other editable or non-editable content. They will also maintain the correct position when the text is scrolled or resized.

Other properties of the div styles again specify the visual effects of the selection such as border width or border color. These properties can be made to be user configurable. It is interesting to note that the div can be personalized with a transparent background image of the peer at or near the selection position, thus making it possible to show a "roster" directly at the place where the selection happens.

A clip property is added to the style of the outmost div element in case the selection is within a scrollable area. Part of the selection will need to be clipped out when it is scrolled off the viewport. Referring again to FIG. 8, for a range r, if the clip window is w, the clip rectangle can be calculated by the following Javascript function:

```
function getClipRect(r) {
    var rv = "rect(auto,auto,auto,auto)";
    if ( r!=null && w!=null ) {
        var left = getLeft(w)+w.clientLeft-getLeft(r);
        var top = getTop(w)+w.clientTop-getTop(r);
        var right = left+w.clientWidth;
        var bottom = top+w.clientHeight;
        rv = "rect(" + top +"," + right + "," +
                    bottom + "," + left + ")";
    }
    return rv;
}
```

The same function applies to the clipping of peer carets in the last sub-section of this document.

All the Javascript functions can be pushed over to a Web page from the broker by insertAdjacentHTML( ), just like a regular HTML segment. Command execScript( ) can serve the same purpose.

The same visual representation of the selection can also be achieved with a VML object or other graphic objects, with their corresponding positions defined the same way as the div elements above. In IE5+, coloring the rectangles returned from the getClientRects function of the recreated range object can achieve a similar effect. A selection can also be highlighted by iterating on all the elements and segments of the range object.

The Selection Position Indication can also serve the purpose of a cross-browser copy-cut-and-paste function. More particularly, since a peer selection in a browser can be bound to a range object, the edits on the selection of the original browser, when moved over to the peer browser, can also be directly applied to the range object. The command is again pasteHTML, or execCommand with a proper command identifier. A clipboardData object needs to be involved in the operation for the access and encoding of the edit data.

The ability to transfer selection positions from one peer browser to another is an important element in browser-to-browser applications: it not only makes it possible for one peer to highlight content on another peer browser and to facilitate cross-browser copy-cut-and-paste functions, but it also makes it possible for other highly interactive customized actions to be defined for the selected content.

Of particular importance is the introduction of user-defined locks on a document. A peer can dynamically select a document section and assign an edit lock to the section. Other peers are prevented from editing the same section. Or the user can dynamically select a section and toggle it as editable or non-editable as desired. Traditional document edit/lock applies to the whole document. With the interactive selection transfer, a highly dynamic and fine-grained edit/lock can be achieved with great control and convenience.

6.5.5.3 Mouse Cursor

A position change of a mouse cursor triggers an onmousemove event, or an ondragover event when it is involved in a drag-and-drop operation. The mouse cursor position indication in a peer browser follows the same process as the Peer Caret Position Indication. The primary question is how to encode the position of the mouser cursor.

The position of the cursor is defined by x, y or clientX, clientY coordinates of the events. Because of the differences in browsers, browser configurations, font sizes, and window sizes, the coordinates in one browser might not make sense in another browser.

The information contained in the srcElement, offsetX, and offsetY of the events provides another definition of the position based on the relative coordinates to the element that the mouse is currently over. An XPointer expression can be constructed from the srcElement alone with the offsetX and the offsetY. The XPointer expression will resolve to a corresponding element in a peer browser. Then an absolute positioned IMG object, a div, a VML graphic shape, or other HTML or graphic objects can be used to indicate the peer mouse cursor. The visual representation can be personalized, making it possible to show a "roster" mouse cursor directly at the place where the mouse moves.

The peer mouse cursor can be positioned to the offsetX and the offsetY relative to the top and left corner of the resolved element. This provides a better solution than that from the absolute x, y or clientX, clientY coordinates of the event.

The solution can be further optimized to take into account the original offsetWidth and offsetHeight of the rectangle that bounds the srcElement. More particularly, assume that the resolved element has offsetWidth' and offsetHeight', then a correction to the relative offsets in a peer browser can be made with the following formulas:

offsetX'=offsetX*(offsetWidth'/offsetWidth)

offsetY'=offsetY*(offsetHeight'/offsetHeight)

where the offsetWidth and offsetHeight are moved over to the peer browser from the original srcElement along with the offsetX and offsetY.

The foregoing formulas actually make a proportional adjustment to the offsets. They work fine if the element that the mouse is over is a Control or an image type element. For a textual type element, the formulas still work, but at times they will not be able to position the peer mouse cursor to the exact same word or the same character. This precision is required in drag-and-drop operations.

This problem can be resolved with the introduction of a helper range in the original browser. The idea is to create a single point range in the original browser document and to allow the range to move its position whenever an onmousemove or an ondragover event occurs:

r.moveToPoint(window.event.x, window.event.y)

where r is the helper range and event is onmousemove or ondragover.

This single point range can be moved over to other peer browsers in the same way as the single point selection range for an edit caret. The reconstructed single point range in a peer browser allows the visual representation of the mouse cursor to be positioned precisely to an individual character. This way, peers can achieve a high degree of logical synchronization with mouse moves.

Another advantage of using the single point range comes when the element is a scrollable area like a textarea or a scrollable div element. Peers may not always have the same viewport on the same scrollable element. The single point range makes it possible to synchronize the viewport of the element among peers by the command r.scrollIntoview(). This way, peers can achieve a high degree of view consistency on scrollable contents.

A clip property can be added to the style of the visual representation when the peer mouse cursor lies in a scrollable area and the view synchronization is not needed. The implementation is the same as the clip to a selection.

The Mouse Cursor Position Indication process facilitates highly dynamic visual feedback of a mouse pointer across browsers, which is particularly useful for applications like online presentation and lecturing.

The cross-browser drag-and-drop operation is also made possible by the Mouse Cursor Position Indication process. Since a peer mouse cursor in a browser is bound to a range object, an ondrop event in the original browser, when moved over to the peer browser, can be directly applied to the range object. The command is again pasteHTML, or execCommand with a proper command identifier. A dataTransfer object needs to be involved in the operation for the access and encoding of the dropped data. The events ondragstart, ondragenter, ondragleaver, ondrag, ondrop, and ondragend can be used to further assist in visual feedback of the mouse cursor shape changes during the drag-and-drop process.

6.5.5.4 Viewport

The viewport of a document represents a visible area of the document on a browser window. A scroll changes the viewport if the area is a scrollable area. A visual representation of a viewport of another peer is not always necessary. However, a visual graphic (e.g., a colored rectangle) that indicates the view area of the peer may be helpful.

A viewport changes when there is an onscroll event or an onresize event. The viewport indication in a peer browser preferably follows the same process as the Peer Caret Position Indication.

Like a mouse cursor position, the position of a scroll bar can be encoded in an XPointer expression with the srcElement of the scroll event, and scrollLeft, scrollTop, scrollWidth, and scrollHeight of the element where the scroll event originated. The amount of vertical and horizontal scroll in a peer browser can be calculated in the same way as that for mouse cursor position with the following formulas:

scrollLeft'=scrollLeft*(scrollWidth'/scrollWidth)

scrollTop'=scrollTop*(scrollHeight'/scrollHeight)

where the scrollWidth' and scrollHeight' are from the element that is resolved in the peer browser from the XPointer expression.

Like those for a mouse cursor position, the above two formulas only provide an approximation to a viewport position, because of the differences in browsers, in their textual flow, and in their coordinate systems.

In order to get a precise viewport description, two single point helper ranges may be used. The idea is to create two single point ranges in the original browser and position one range to the top, left corner of the viewport of a scrollable area, and another range to the bottom, right corner of the viewport of the same scrollable area. The two corners of a viewport can be found with the following procedure:

left: w.getBoundingClientRect( ).left+ document.body.scrollLeft−document.body.clientLeft;

top: w.getBoundingClientRect( ).top+ document.body.scrollTop−document.body.clientTop;

bottom: top+w.clientHeight;

right: left+w.clientwidth;

where w is the scrollable area of the viewport. A typical value for w is the document body element document-.body.

The two ranges are allowed to move their positions accordingly whenever the viewport changes. They can be moved over to other peer browsers in the same way as the single point selection range for an edit caret. The reconstructed single point ranges in a peer browser allow the visual representation of the viewport to be positioned precisely at its logical start and end points. The logical points can actually be brought to view in a peer browser by issuing the command scrollIntoView() to either ranges. This way, peers can achieve a high degree of logical synchronization with viewports and a high degree of view consistency on scrollable contents.

A clip property can be added to the style of the visual representation. The implementation is preferably the same as the clip to a selection. The visual representation can also be personalized to show a "roster" image directly with the viewport.

6.5.5.5 Focused Element

Figure 7:
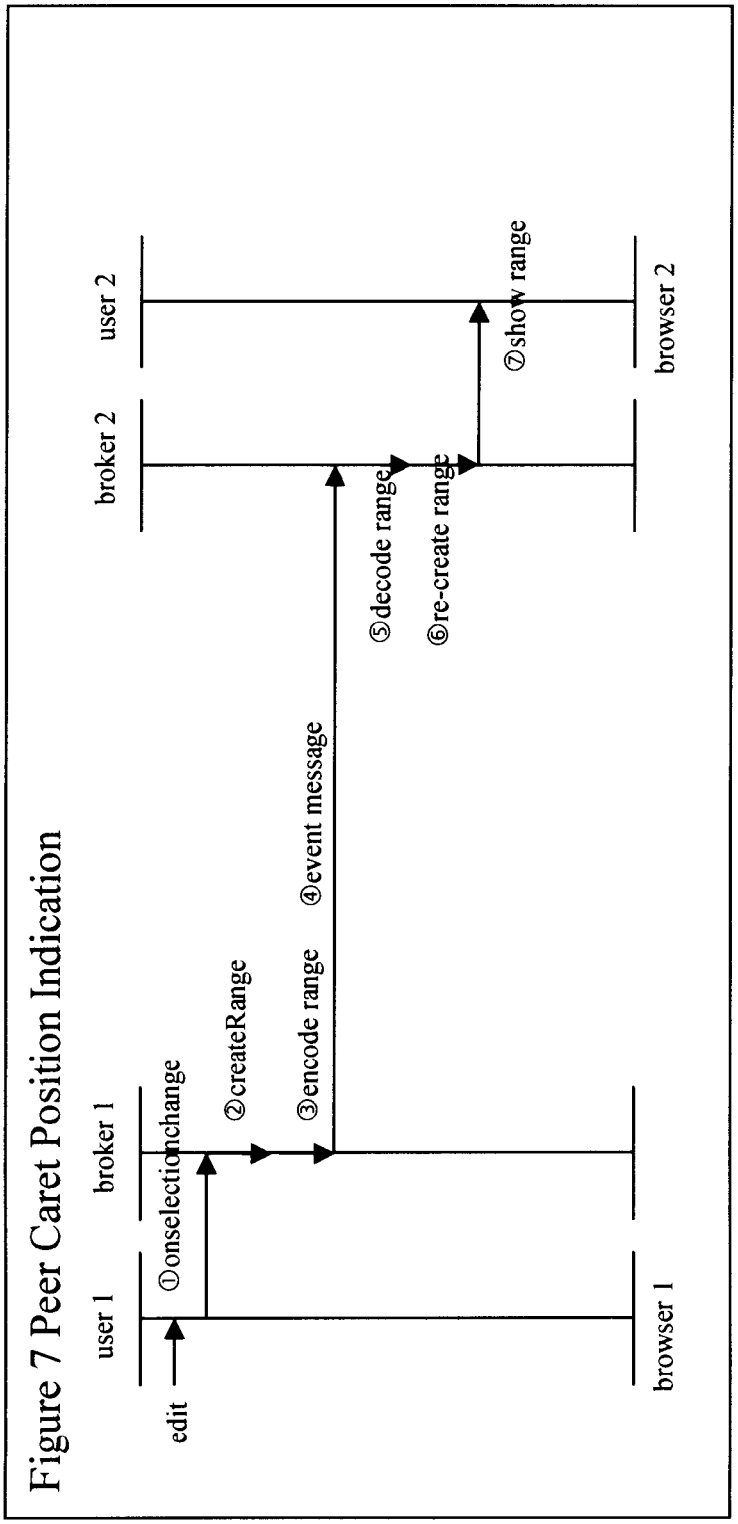
FIG. 7 is a schematic diagram illustrating peer caret position indication with the present invention.

IE5+ allows only one element to be in focus at a given time on a document. A switch of the focused element triggers a pair of onfocus and onblur events and a pair of onfocusin and onfocusout events. The position of the focused element is the position of the srcElement of the events. The XPointer encoding of the srcElement can move the position over to peer browsers. The XPointer expression will resolve to the corresponding element in a peer browser. Then an absolute positioned IMG object, a div, a VML graphic shape, or other graphic objects can be used to indicate the focused element. The visual representation can be personalized, making it possible to show a "roster" directly to the place where the focused element is located. The process is preferably the same as that of the Peer Caret Position Indication of FIG. 7.

A clip property can be added to the style of the visual representation when the focused element lies in a scrollable area. The implementation is the same as the clip to a selection. The focused element can be brought to the viewpoint of a peer browser by issuing a scrollIntoView( ) command from the element.

6.5.5.6 Additional Comments

This section discusses five types of peer position indication on peer browsers: edit caret, selection, mouse cursor, viewport, and focused element. The key to peer position indication is to encode a position relative to its containing object (a direct parent or one of its ancestors) instead of its absolute X-Y coordinates in the browser window. Relative positions are preferably implemented in range objects and XPointer expressions. Although the exemplary implementation is in Javascript on IE5+, the idea is language independent and browser independent. For example, IE5+ markup services can be used for the implementation in place of Javascript, since a range position can be directly translated to a markup pointer position. Netscape 6+ with the W3C range object can also be used, as well another browser. The visual representation of an indicator can be well implemented in a platform-specific manner such as a Windows object on the Windows platform.

6.6 Applications

The present invention can be used for both personal and business communication. Industries can benefit from the present invention in that complex business objects can be shared and changes can be communicated in real-time. Communication efficiency can be greatly improved in applications like dialogs, negotiations, planning, scheduling, financing, trading, marketing, supporting, and sales. People can come together in navigating the Web, filling in a form, making a decision, exploring a design idea, showing a product, authoring and annotating an article, translating a document, scheduling an event, playing a game, etc.

Three exemplary application scenarios are detailed in the following.

6.6.1 Exemplary Application: Fill in a Form with You™

The HTML form has been a profound way of interaction for Web applications. Yet users of a form are often presented with a Web server without a human face. A help file is often the best assistance the user can get.

The present invention brings a new dynamic to the Web form interaction process. Peer helps peer. An end user is able to get instant help from other peers in the form-filling process if a form is presented and shared among the peers.

By way of example, suppose that the end user is a computer buyer, and a peer is a sales representative from a computer manufacturer. The end user needs help on computer configuration. By way of further example, the end user may be a senior citizen, and the peer may be a government employee. The senior citizen may need help in filling out a social benefit form.

The present invention enhances the communication by establishing a peer channel for form interactions. A peer can help in filling out particular items of a form and the items are immediately visible to the other; the sales person can suggest a different configuration, or the government officer can explain a specific benefit. Customer relationships are strengthened in a way comparable to face-to-face interaction.

Traditional Web forms require server-side software to be in place before any interaction can begin. This requires that the software be developed and then installed, which can require substantial time and expense. As a result, forms are difficult to change once deployed.

The browser-to-browser form communication is independent of server software. No server needs to be involved. Any Web form can be used and updated immediately, including those from a local hard drive. This is especially useful out filling out routine forms.

In fact, forms can be made of plain HTML texts in addition to the traditional Web form elements. The plain HTML text forms are similar to paper-based forms and look most natural to end-users. The present invention makes it possible for this kind of form to be exchanged and updated among peers as well, by taking advantage of the recent advances in browsers with authoring capabilities (e.g., IE5.5+).

6.6.2 Exemplary Application: Show a Product to You™

The idea of "Fill in a form together" can be extended to "Show and Tell" on the Web. A person can use the invention to show a product directly to another person, do a presentation, or give a lecture.

For example, a sales representative from a music store can play a music segment for a customer. The music piece can be combined with different sound effects and be shown to the customer at the right point in the sales discussion.

When a customer wants to see an alternative product, the sales representative can push the alternative product to the customer and have a side-by-side comparison of the products.

In essence, the present invention provides a new way of doing business on the Web.

6.6.3 Exemplary Application: Browser-to-Browser Application Framework™

The present invention makes it possible for any Web content and media to be used for browser-to-browser communication and serves as a good candidate for a general Peer-to-Peer Application Framework. This framework, in the context of the present invention, is defined as a Browser to-Browser Application Framework™.

More particularly, an existing Web application can use the present invention to become a peer-to-peer application. The browser user interface of the application, which used to interact with the Web server, can now be used for peer-to-peer interactions. Generally a Web application consists of various HTML forms. The scenario Fill in a form with you™ (discussed above) demonstrates that people can fill in forms together. One person can make a particular form of the application visible and changeable to another.

New peer-to-peer applications can be developed for the Browser-to-Browser Application Framework™, given the organizational flexibility and rich media of Web contents. People can use HTML and XHTML to design forms and tables; use SVG to design graphics; and use Flash to design animations. Once the user interface is finished, the application itself can become a peer-to-peer application by using the Browser-to-Browser Application Framework™. In other words, people can focus on the specific needs of the user interface and business logic of the application without worrying about the details of the underlying peer-to-peer communication. The application is automatically enabled by the underlying framework to function in a peer-to-peer manner. Development cost is dramatically reduced because of the present invention.

Another advantage of the present invention comes from application support. Once the application is peer-to-peer enabled by the framework, the contents in one peer's browser can be made visible to another peer. By way of example, the first peer is an end user and the second peer is a customer support representative. Now the end user's problems on the application can be effectively determined, because the customer support representative can see the user's application immediately in a browser. Furthermore, the customer support representative can actually manipulate the application through the browser (if the right permission has been provided), thereby facilitating resolution of the problem.

6.7 Comparisons

The context of the present invention comes from three different fields: Web browsing, Web authoring, and Instant Messaging.

6.7.1 Instant Messaging

Instant Messaging services (e.g., ICQ, AOL Instant Messenger, MSN Messenger, Yahoo! Messenger, and more recently Jabber and Groove) have seen a soaring popularity in the last few years. The communication runs from a pure peer-to-peer model (i.e., Groove) to a client-server model (i.e., Jabber).

Though instant in their nature, many of the IM implementations suffer from a traditional line-oriented document model for their message presentation. The line-oriented model has its roots in Unix talk and IRC Chat, where each participant talks to other participants by typing messages. The messages are rendered to chat clients in chronological order. Messages become history once delivered and rendered, and the messages are not supposed to be changed by end users. This is essentially a one-dimensional (1D) sequential model, with messages going along the time line.

Some recent Instant Messaging systems (e.g., ICQ, AOL, and MSN) have begun providing rich text fonts, voice messages and telephony integration. Jabber is experimenting with XHTML in its message body, which makes it possible to render rich text fonts and tables and other messages of higher complexity. However, the chronological line-oriented 1D nature of the system is still present. No current IM implementations allow end users to update the messages once delivered and rendered.

Groove, which is known for its security, has put many individual tools into its toolbox: casual notes, instant messaging, discussion, outline, white board, calendars, navigation guidance, etc. Though organized in tabbed folders, those pre-defined tools are largely separated. For example, it is impossible to have a customized form and embed the form in a calendar with Groove.

Groove comprises a proprietary system based on Windows COM components. The contents and their representations are realized by COM, and separated by each individual COM component. Groove essentially lacks the open HTML/XHTML and DOM standards of Web browsers and cannot offer the dynamics and flexibility of the content editing and reorganization capabilities which the present invention provides. The whiteboard and calendar in Groove are separated from one another and cannot be combined into a single document; in addition; their styles are fixed and cannot easily be customized to meet the needs of specific applications.

The browser component in Groove is another COM component. It is used for Web browsing and navigation guidance. There is no browser-to-browser object addressing and identification mechanism. There are no post-updates and reorganization for the browser contents. The concept of the Browser-to-Browser Application Framework™ has never been mentioned anywhere in Groove and or any other IM systems. The present invention provides User Defined Objects in HTML/XHTML/XML and their variations, and can use any sophisticated objects, media and contents available on the Web for peer-to-peer communication and to meet the design needs of specific applications. Contents in browsers can be directly manipulated, and changes are synchronized as deltas among participating peers.

6.7.2 Web Browsing

Web technology essentially follows a pull model. Web browsers send HTTP requests (GET, POST) to the Web servers and receive contents in response.

The model of push feeds contents directly from Web servers to Web clients. RSS, for example, is a push protocol for headline news. Generic push, however, has never come to be a protocol for the Web. For many people, push went quiet during the last few years when systems like Marimba and Castanet disappeared.

Instant Messaging essentially needs a push model. Messages from other clients are pushed to a client in real-time while that client is viewing or composing messages. However, since push is not properly supported by the current Web, this makes many people, including domain experts, believe that the Web browser is not a good platform for Instant Messaging.

See, for example, a recent interview from "XML Magazine" editor Steve Gillmor to Jabber founder Jeremie Miller in its column "EXPERT VOICE"—"Interview: More Than Just Jabber", XML Magazine, Winter 2000/2001, Vol. 1, No. 5:

> Gillmor: Do you have any plans to include your protocol feed, if you will, in a browser directly, as opposed to a separate Instant Messaging client?
>
> Miller: There's a Mozilla Jabber client in the works—a component that plugs in so that Mozilla, as a platform, can take advantage of Jabber. But Web browsers weren't really designed to be able to receive these real-time events and handle sockets in the way that we do. They're really a "pull" sort of model. The action has to be initiated inside the Web browser, so it's difficult to map some sort of Instant Messaging model into a Web browser because they just weren't designed to do that.

Some Instant Messaging systems already have browser interfaces. For example, there is ICQ in IE, and Jabberzilia in Mozilla. However, these IM implementations are all mimics of their native (Windows, Linux, etc.) implementations. They do not operate on, and exchange the contents and media of, Web browsers. They suffer from the same 1D sequential line-oriented problem discussed above. Post-updates and delta synchronization have never been required of these systems.

6.7.3 Web Authoring

Traditionally, Web browsers and HTTP have only been used for Web browsing, not Web authoring. Some recent trends, led by Manila of UserLand, Wiki Edit, and WebDAV (Web-based Distributed Authoring and Versioning) from Microsoft, try to solve this shortcoming in the evolution of the Web.

Manila is one of the Web browsers that provides both browsing and authoring in the same browser. The changes made in the browser can be uploaded, as a whole, to authorized Web servers and made public to users of the Web site. Wiki Edit employs a similar whole-document upload model with more dynamic support for concurrent users.

Microsoft's efforts in Web authoring follow two paths: MSHTML editor and WebDAV. MSHTML editor is implemented in IE5 and above. It makes DHTML contents in IE fully or partially editable. WebDAV abstracts writable Web pages to the concept of Web Folders. Standard HTTP protocol is extended to allow the folders and their files to be shared and updated by a group of users in the same Web server.

Microsoft is providing strong support for WebDAV on the client side: IE 5+ is provided with Web Folders, which allows the user to view and manipulate a WebDAV repository inside the Web browser. Office 2000 also supports editing Web pages in-place using DAV, and makes use of the locking methods to prevent the lost update problem. Adobe GoLive 5 also supports WebDAV.

The foregoing systems more naturally support peers and conversations than the traditional Web, but the conversations between these peers are still predominantly "one-way". The files may be shareable, but the content is centralized, leading to the traditional model of producer and consumer, one-direction relationship among participants. They are not designed for the peer-to-peer model of communication. The participants lack their identity as that of instant messaging systems. None of the foregoing systems provides the flexibility of the browser-to-browser object addressing and delta change synchronization of the present invention.

6.8 Additional Matters

"Browser as Platform" should never be overlooked, given the richness of the Web contents and the popularity of Web browsers.

The present invention solves the complexities of the integration of Web browsing, Web authoring, and Instant Messaging, and offers the uniqueness of browser-based rich media manipulation and synchronization of Web contents among participating peers. The advantages are exemplified in the combination of the three, and give the present invention a great lead in peer-to-peer communication.

The full page Web model enables the Instant Messaging side to enjoy the rich media of Web contents. Tables, forms, images, voice clips, movies, and even 3D objects can now be transmitted and shared immediately among peers. Significantly, Javascripts, VB scripts, or any other scripts can now be transmitted and shared among participating browsers, which makes content manipulation tools written in these scripts instantly shareable.

The Web model also makes tool development and sharing much easier because of its openness. Anyone who is familiar with HTML/XHTML/XML and a script language can be a content developer or a tool developer. The basic requirements can be easily met given the popularity of the Web.

The invention makes a Web page an instant sharing and cooperation media. The peer-to-peer model allows people to exchange tables, forms, images, voice clips, movies, 3D graphics, and many other Web objects. The objects can be further manipulated or updated by Web tools. A picture can be resized; a table cell can be changed; and the overall layout can be re-designed. People's experience in Web browsing now finds its place in immediate information exchange and updating. The experience is further enhanced with a strengthened relationship when people do business together on the new peer-to-peer Web.

7. Modifications

A system and method has been shown in the above embodiments for the effective implementation of a peer-to-peer communication system for use over an underlying computer network system. While various preferred embodiments have been described and shown, it will be understood that there is no intent to limit the invention by such disclosure but, rather, it is intended to cover all modifications and alternate constructions falling within the spirit and scope of the invention.

What is claimed is:

1. A peer-to-peer communication system for use over an underlying computer network system, said peer-to-peer communication system comprising:
   at least two peers, each said peer comprising:
      a Web browser; and
      a broker interposed between said browser and the underlying computer network system, with said broker being adapted to (1) monitor a first event taking place within said browser, encode said first event and associated changes in a first event message, and push said first event message to said at least one other peer over the underlying computer network system, whereby said at least one other peer can reproduce on said at least one other peer the changes associated with the first event; and (2) receive a second event message from said at least one other peer, where said second event message has been encoded to correspond to a second event and associated changes taking place on said at least one other peer, decode said second event message and push the results to said browser, whereby to recreate the changes associated with the second event within said browser.

2. A peer-to-peer communication system according to claim 1 wherein the changes are recreated by creating the second event and reposting the second event on the browser.

3. A peer-to-peer communication system according to claim 1 wherein the underlying computer network system comprises an Instant Messenger (IM) system, and said broker is adapted to communicate with said at least one other peer over the Instant Messenger system.

4. A peer-to-peer communication system according to claim 3 wherein the Instant Messenger (IM) system comprises one of the group consisting of AOL AIM Instant Messenger; Microsoft MSN Messenger; Yahoo! Messenger; ICQ; Jabber; Groove; and Sun JXTA.

5. A peer-to-peer communication system according to claim 1 wherein said browser and said broker comprise two distinct software programs.

6. A peer-to-peer communication system according to claim 1 wherein said broker is built into said browser.

7. A peer-to-peer communication system according to claim 1 wherein said broker comprises a browser plug-in.

8. A peer-to-peer communication system according to claim 1 wherein said browser and said broker reside on the same machine.

9. A peer-to-peer communication system according to claim 1 wherein the contents of said browser are represented in one of the group consisting of HTML; XHTML; XML; and their variations.

10. A peer-to-peer communication system according to claim 9 wherein said first event message is an XML message.

11. A peer-to-peer communication system according to claim 9 wherein said second event message is an XML message.

12. A peer-to-peer communication system according to claim 9 wherein said first event message and said second event message are XML messages.

13. A peer-to-peer communication system according to claim 9 wherein said browser comprises Microsoft Internet Explorer (IE).

14. A peer-to-peer communication system according to claim 9 wherein said browser comprises one from the group consisting of Mozilla and its variants.

15. A peer-to-peer communication system according to claim 9 wherein said browser comprises Netscape Navigator.

16. A peer-to-peer communication system according to claim 1 wherein the contents of said browser are uniquely addressable by said broker using an established identification mechanism.

17. A peer-to-peer communication system according to claim 16 wherein the contents of said browser are uniquely addressable using the Document Object Model (DOM) defined by The World Wide Web Consortium (WC3).

18. A peer-to-peer communication system according to claim 16 wherein the contents of said browser are uniquely addressable using a stream-based HTML document model.

19. A peer-to-peer communication system according to claim 18 wherein the contents of the browser are uniquely addressable using a stream-based HTML document model with absolute character position.

20. A peer-to-peer communication system according to claim 16 wherein the contents of said browser are uniquely addressable using a DHTML model.

21. A peer-to-peer communication system according to claim 16 wherein said identification mechanism comprises one of the group consisting of an ID attribute for a DOM element in a browser; an XPATH expression; and XPointer expression; an XLINK expression; an Internet Explorer (IE) Markup Pointer identifying contents in a browser; an absolute character position in a stream-based HTML document model; and an object naming identification mechanism in a DHTML model.

22. A peer-to-peer communication system according to claim 21 wherein said identification mechanism comprises an XPointer expression, and further wherein said XPointer expression is constructed by walking backwards through the DOM tree until finding the earlier of the root or the ID attribute of a containing object.

23. A peer-to-peer communication system according to claim 21 wherein said XPointer expression is resolved by searching the DOM tree from the root of the sub tree to the final node of the XPointer path.

24. A peer-to-peer communication system according to claim 23 wherein the root of the subtree is an object ID or the root of the document.

25. A peer-to-peer communication system according to claim 1 wherein the browser-broker connection is implemented in one of the group consisting of the Component Object Model (COM); and the Cross Platform Component Object Model (XPCOM).

26. A peer-to-peer communication system according to claim 1 wherein the browser-broker connection is implemented in one of the group consisting of HTTP; XML-RPC; and the Simple Object Access Protocol (SOAP).

27. A peer-to-peer communication system according to claim 1 wherein the contents of said browser comprise an embedded object.

28. A peer-to-peer communication system according to claim 27 wherein said embedded object exposes only a specific set of properties and procedures to its host.

29. A peer-to-peer communication system according to claim 28 wherein said embedded object comprises one of the group consisting of the Microsoft Media Player; the Microsoft Visio ActiveX plug-in; the Macromedia Flash Player ActiveX control; the Macromedia Flash Player Java applet; and the WildTangent Web Driver Java Plug-in for 3D graphics and games.

30. A peer-to-peer communication system according to claim 27 wherein said embedded object exposes its internal components, properties and procedures to its host.

31. A peer-to-peer communication system according to claim 30 wherein said embedded object comprises one of the group consisting of Mozilla's support for MathML and SVG; IE's support for VML, HTML+TIME; the Adobe SVGViewer plug-in; and the Macromedia Flash Player implemented in IE's behavior.

32. A peer-to-peer communication system according to claim 27 wherein said embedded object is configured to release said first event to said browser, whereupon said broker can monitor said first event, encode said first event in said first event message, and push said first event message to said at least on other peer.

33. A peer-to-peer communication system according to claim 27 wherein said second event message is configured so that said broker activates a specific set of properties and procedures of said embedded object.

34. A peer-to-peer communication system according to claim 27 wherein said second event message is configured so that said broker will repost said second event to said embedded object.

35. A peer-to-peer communication system according to claim 1 wherein only changes to a document are pushed to peers.

36. A peer-to-peer communication system according to claim 35 wherein said changes comprise content changes.

37. A peer-to-peer communication system according to claim 35 wherein said changes comprise style changes.

38. A peer-to-peer communication system according to claim 35 wherein said changes comprise view changes.

39. A peer-to-peer communication system according to claim 35 wherein said changes comprise navigation changes.

40. A peer-to-peer communication system according to claim 35 wherein said broker is configured so that when it pushes the results of said second event message to said browser, it marks the same to prevent re-transmission to the other peers.

41. A peer-to-peer communication system according to claim 1 wherein said second event message contains information regarding which peer originated said second event message.

42. A peer-to-peer communication system according to claim 41 wherein said broker is configured to take selective action according to which peer originated said second event message.

43. A peer-to-peer communication system according to claim 1 wherein said broker is configured to push the results to said browser so that said browser will utilize its script engine to respond to events and associated changes originated at other peers.

44. A peer-to-peer communication system according to claim 1 wherein concurrency control is maintained among the peers.

45. A peer-to-peer communication system according to claim 44 wherein concurrency control is maintained by using at least one of the group consisting of locks; and timestamp ordering.

46. A peer-to-peer communication system according to claim 45 wherein said broker is configured so that said locks may be applied on the basis of one or more objects and/or portions of objects.

47. A peer-to-peer communication system according to claim 46 wherein said broker is configured so that said timestamp ordering accommodates changes to objects and/or portions of objects on multiple peers.

48. A peer-to-peer communication system according to claim 47 wherein said broker is configured so that said timestamp ordering comprises a base time synchronization and, for each change, a starting timestamp and an ending timestamp.

49. A peer-to-peer communication system according to claim 1 wherein said broker is configured to send a tool to said at least one another peer.

50. A peer-to-peer communication system according to claim 1 wherein said broker is configured to push a tool to said browser.

51. A peer-to-peer communication system according to claim 50 wherein said tool was received from said at least one other peer.

52. A peer-to-peer communication system according to claim 50 wherein said tool was resident with said broker.

53. A peer-to-peer communication system according to claim 50 wherein said broker is configured to request a tool from a peer.

54. A peer-to-peer communication system according to claim 53 wherein said broker is configured so that when it decodes said second event message, it will determine whether a non-resident tool is required and, if so, it will request the non-resident tool from the peer originating said second event message.

55. A peer-to-peer communication system according to claim 50 wherein said tool comprises at least one from the group consisting of scripts, style sheets, HTML/XHTML/XML contents and other special markups.

56. A peer-to-peer communication system according to claim 50 wherein said tool comprises at least one from the group consisting of an ActiveX control and a Java applet.

57. A peer-to-peer communication system according to claim 50 wherein said tool comprises a plug-in.

58. A peer-to-peer communication system according to claim 1 wherein said broker is configured to observe the screen position of said browser and to advise the at least one other peer of the same.

59. A peer-to-peer communication system according to claim 58 wherein said broker is configured to encode a position relative to the contents of said browser.

60. A peer-to-peer communication system according to claim 59 wherein said broker is configured to encode a position relative to a containing object.

61. A peer-to-peer communication system according to claim 60 wherein said broker is configured to encode a position relative to a containing object and the character position relative to the beginning or ending of that containing object.

62. A peer-to-peer communication system according to claim 61 wherein said broker is configured to determine the character position using a range object.

63. A peer-to-peer communication system according to claim 60 wherein said broker is configured to encode a position relative to a containing object and the relative proportional position within the containing object.

64. A peer-to-peer communication system according to claim 59 wherein said broker is configured to reflect the screen position on said browser using a range object.

65. A peer-to-peer communication system according to claim 1 wherein said broker is configured to receive the screen position of said at least one other peer and to reflect the same on its associated browser.

66. A method for operating a peer-to-peer communication system over an underlying computer network system, said method comprising:
  (1) initiating a first event in a first browser;
  (2) capturing the first event and associated changes with a first broker;
  (3) encoding the first event and associated changes in a first event message;
  (4) pushing the first event message to a second broker over the underlying computer network system;
  (5) decoding the first event message into corresponding commands for recreating the first event and associated changes on a second browser; and
  (6) pushing the corresponding commands to the second browser, whereby to recreate the changes associated with said second event on said second browser.

67. A method according to claim 66 wherein said underlying computer network system comprises an Instant Messenger (IM) system.

68. A method according to claim 66 wherein said first event message is encoded in XML.

69. A method according to claim 66 wherein object references for said first event are serialized in XPointer expressions.

70. A method according to claim 66 wherein the peer-to-peer dialogue is initiated with a blank Web page.

71. A method according to claim 66 wherein the peer-to-peer dialogue is initiated with an existing Web page.

72. A method according to claim 71 wherein the existing Web page originates at one of the peers, and the originating peer pushes the existing Web page to the other peers.

73. A method according to claim 71 wherein the existing Web page originates at a non-peer site, and all of peers obtain the existing Web page from that non-peer site.

74. A method according to claim 71 wherein the existing Web page originates at a non-peer site, one of the peers obtains the existing Web page from the non-peer site, and the obtaining peer pushes the existing Web page to the other peers.

75. A method according to claim 66 wherein, upon receiving said corresponding commands, the second broker causes the first broker to push a tool to the second browser.

76. A peer-to-peer communication system for use over an underlying computer network system, said peer-to-peer communication system comprising:
  a broker interposed between a browser located on a peer and the underlying computer network system, with said broker being adapted to (1) monitor a first event taking place within said browser, encode said first event and associated changes in a first event message, and push said first event message to at least one other peer over the underlying computer network system, whereby said at least one other peer can reproduce on said at least one other peer the changes associated with the first event; and (2) receive a second event message from said at least one other peer, where said second event message has been encoded to correspond to a second event and associated changes taking place on said at least one other peer, decode said second event message and push the results to said browser, whereby to recreate the changes associated with the second event within said browser.

* * * * *